(12) United States Patent
Kim et al.

(10) Patent No.: US 10,410,407 B2
(45) Date of Patent: Sep. 10, 2019

(54) METHOD FOR PROCESSING IMAGE AND ELECTRONIC DEVICE THEREOF

(71) Applicant: Samsung Electronics Co., Ltd, Gyeonggi-do (KR)

(72) Inventors: Chang Hoon Kim, Gyeonggi-do (KR); Amit Kumar, Haryana (IN); Pradeep Choudhary, Rajasthan (IN); Sumedh Mannar, Andhra Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 15/432,903

(22) Filed: Feb. 14, 2017

(65) Prior Publication Data

US 2017/0243396 A1    Aug. 24, 2017

(30) Foreign Application Priority Data

Feb. 19, 2016    (KR) ........................ 10-2016-0019523

(51) Int. Cl.
| | |
|---|---|
| *G06T 15/50* | (2011.01) |
| *G06T 15/06* | (2011.01) |
| *G06T 15/20* | (2011.01) |
| *G06K 9/00* | (2006.01) |
| *G06T 7/73* | (2017.01) |

(52) U.S. Cl.
CPC ........ *G06T 15/506* (2013.01); *G06K 9/00248* (2013.01); *G06K 9/00268* (2013.01); *G06T 7/73* (2017.01); *G06T 15/06* (2013.01); *G06T 15/205* (2013.01); *G06T 2207/30201* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 7,859,538 | B2* | 12/2010 | Isner | ....................... G06T 13/40 345/473 |
| 8,115,774 | B2* | 2/2012 | Biehn | ..................... G06T 13/40 345/473 |
| 8,315,461 | B2 | 11/2012 | Free | |
| 8,855,422 | B2 | 10/2014 | Free | |
| 2013/0076932 | A1* | 3/2013 | Chhibber | ............. A61B 5/0077 348/222.1 |

FOREIGN PATENT DOCUMENTS

JP    5088220 B2    12/2012

\* cited by examiner

*Primary Examiner* — Said Broome

(57) ABSTRACT

A device and method for applying a virtual lighting effect in an electronic device are provided. The electronic device includes a display, a memory configured to store a first normal map and a second normal map corresponding to a face, and a processor. The processor is configured to acquire a first image and detect a face region in the first image. Additionally, the processor is configured to determine a normal map corresponding to at least a partial region of the face region based on the first normal map and the second normal map; and display a second image, based on the determined normal map, on the display. The second image includes the first image after a virtual lighting effect is applied thereto.

18 Claims, 20 Drawing Sheets

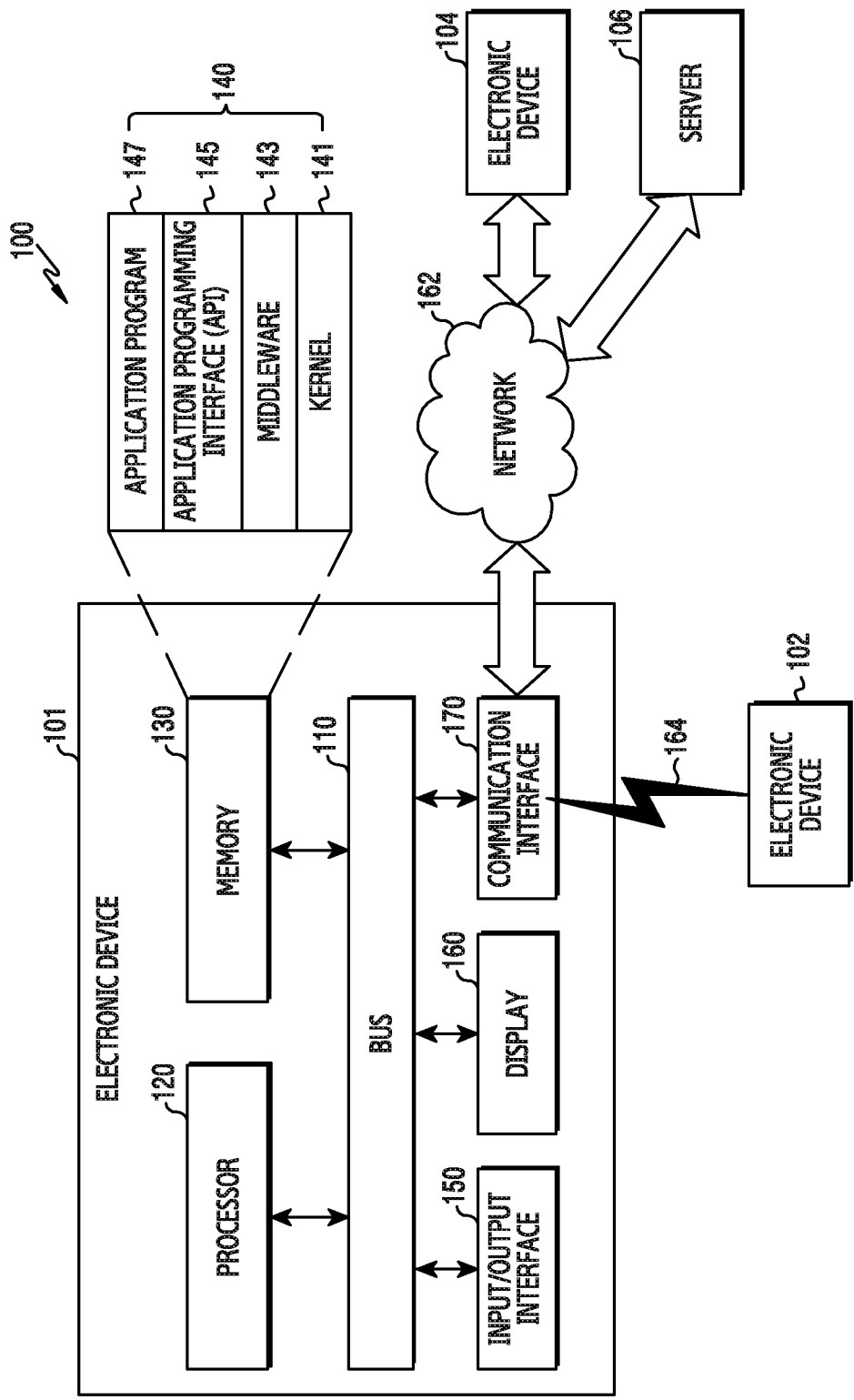

METHOD FOR PROCESSING IMAGE AND ELECTRONIC DEVICE THEREOF

CROSS-REFERENCE TO RELATED APPLICATION(S) AND CLAIM OF PRIORITY

The present application is related to and claims the priority under 35 U.S.C. § 119(a) to Korean Application Serial No. 10-2016-0019523, which was filed in the Korean Intellectual Property Office on Feb. 19, 2016, the entire content of which is hereby incorporated by reference.

TECHNICAL FIELD

Various embodiments of the present disclosure relate to a device and method for processing an image in an electronic device.

BACKGROUND

With the growth of information telecommunication technologies and semiconductor technologies, various electronic devices are developing into multimedia devices providing various multimedia services. For example, the electronic devices can provide various multimedia services such as a broadcasting service, a wireless Internet service, a camera service, and a music play service.

Through the camera service, the electronic device can easily acquire an image (e.g., a photograph or a video). The electronic device can apply a diversity of graphic effects to the image in order to satisfy user's various desires.

SUMMARY

An electronic device can apply a virtual lighting effect to an image acquired in the electronic device. For example, the electronic device can perform a three-dimensional modeling operation of arranging an image for applying the virtual lighting effect on a three-dimensional spatial coordinate. The electronic device can apply the virtual lighting effect of arranging a virtual light source on the three-dimensional spatial coordinate, performing a ray tracing algorithm, and adjusting a brightness of a face region included in the image.

However, owing to the number of operations of the three-dimensional modeling operation and the ray tracing algorithm, the electronic device can suffer a delay in applying the virtual lighting effect to the image. Accordingly, the electronic device may have difficulty providing the virtual lighting effect in real-time.

To address the above-discussed deficiencies, it is a primary object to provide a device and method for applying a virtual lighting effect to an image in an electronic device.

According to various embodiments of the present disclosure, an electronic device can include a display, a memory configured to store a 1st normal map and a 2nd normal map that correspond to a face, and at least one processor. The at least one processor can be configured to acquire an image, detect a face region from the image, determine a normal map corresponding to at least a partial region of the face region on at least the basis of the 1st normal map and the 2nd normal map, and display the image on the display in a state in which a virtual lighting effect is applied to the at least partial region or a peripheral region thereof, on at least the basis of the determined normal map.

According to various embodiments of the present disclosure, a method for operating in an electronic device can include the operations of acquiring an image, detecting a face region from the image, determining a normal map corresponding to at least a partial region of the face region on at least the basis of a 1st normal map and a 2nd normal map stored in the electronic device, and displaying the image in a state in which a virtual lighting effect is applied to the at least partial region or a peripheral region thereof, on at least the basis of the determined normal map.

According to various embodiments of the present disclosure, there can be provided a computer-readable recording medium recording a program for executing the operations of acquiring an image, detecting a face region from the image, determining a normal map corresponding to at least a partial region of the face region on at least the basis of a 1st normal map and a 2nd normal map stored in the electronic device, and displaying the image in a state in which a virtual lighting effect is applied to the at least partial region or a peripheral region thereof, on at least the basis of the determined normal map.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1A illustrates an electronic device within a network environment according to various embodiments of the present disclosure.

DETAILED DESCRIPTION

Figure 1B:
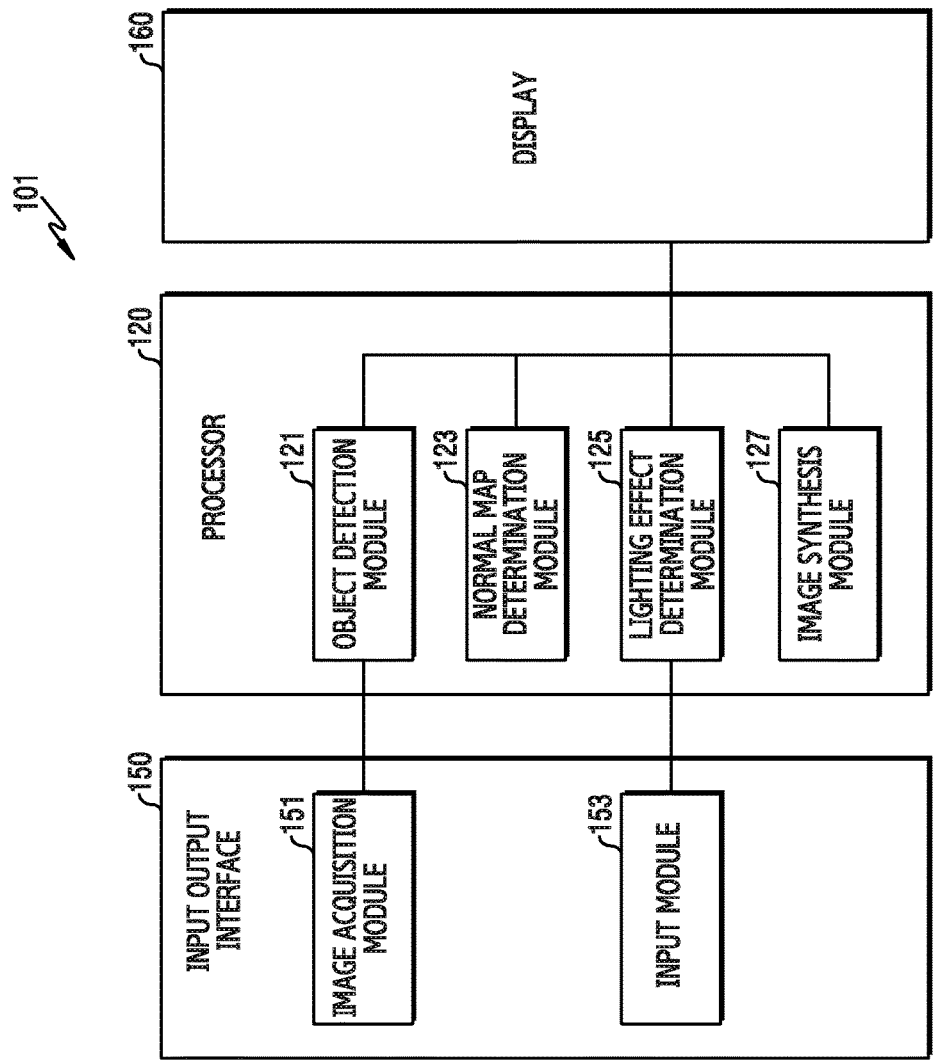
FIG. 1B illustrates a block diagram of an electronic device according to various embodiments of the present disclosure.

FIGS. 1A through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements. As used herein, singular forms may include plural forms as well unless the context explicitly indicates otherwise.

The terms "A or B", "at least one of A or/and B" or "one or more of A or/and B" used in the various embodiments of the present disclosure include any and all combinations of words enumerated with it. Although the term such as "first" and "second" used in various embodiments of the present disclosure may modify various elements of various embodiments, these terms do not limit the corresponding elements. It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element.

The expression "configured to (or set to)" used in various embodiments of the present disclosure may be used interchangeably "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1A illustrates an electronic device 101 within a network environment 100 according to various embodiments of the present disclosure.

Referring to FIG. 1A, the electronic device 101 can include a bus 110, a processor 120 (e.g., including processing circuitry), a memory 130, an input output interface 150 (e.g., including input/output circuitry), a display 160 (e.g., including display circuitry), and a communication interface 170 (e.g., including camera circuitry). In any embodiment, the electronic device 101 can omit at least one of the constituent elements or additionally have another constituent element.

The bus 110 can, for example, include a circuit coupling the constituent elements 120 to 170 with one another and forwarding communication (e.g., a control message and/or data) between the constituent elements.

The processor 120 can include one or more of a Central Processing Unit (CPU), an Application Processor (AP), a Communication Processor (CP) or an Image Signal Processor (ISP). The processor 120 can, for example, execute operation or data processing for control and/or communication of at least one other constituent element of the electronic device 101.

According to one embodiment, the processor 120 can apply a virtual lighting effect to an image acquired in the electronic device 101, based on a normal map corresponding to the image acquired in the electronic device 101. For example, the processor 120 can choose or generate a normal map corresponding to the pose of a face included in the image, based on a plurality of reference normal maps (e.g., a 1st normal map and a 2nd normal map) stored in the memory 130. The processor 120 can apply the virtual lighting effect to a face region of the corresponding image, based on the normal map corresponding to the pose of the face and virtual light source information (e.g., a position, a quantity of light, a color, a type, etc.). For instance, the normal map can represent a texture storing a normal vector that is used for showing a two-dimensional image in three dimensions. In detail, the normal map can include information on a normal vector of a three-dimensional object corresponding to each two-dimensional pixel so as to show the three-dimensional object checked in a specific direction (e.g., angle) in two dimensions.

The memory 130 can include a volatile and/or non-volatile memory. The memory 130 can, for example, store an instruction or data (e.g., a reference normal map) related to at least one other constituent element of the electronic device 101. According to one embodiment, the memory 130 can store a software and/or program 140. For example, the program 140 can include a kernel 141, a middleware 143, an Application Programming Interface (API) 145, an application program (or "application") 147, etc. At least a part of the kernel 141, the middleware 143, or the API 145 can be called an Operating System (OS).

The kernel 141 can, for example, control or manage system resources (e.g., the bus 110, the processor 120, the memory 130, etc.) that are used for executing operations or functions implemented in other programs (e.g., the middleware 143, the API 145, or the application program 147). Also, the kernel 141 can provide an interface that is capable of controlling or managing the system resources by enabling the middleware 143, the API 145, or the application program 147 to gain access to the individual constituent element of the electronic device 101.

The middleware 143 can, for example, perform a relay role of enabling the API 145 or the application program 147 to communicate and exchange data with the kernel 141. Also, the middleware 143 can process one or more work requests received from the application program 147 in accordance with the order of priority. For example, the middleware 143 can grant at least one of the application programs 147 the order of priority capable of using the system resources (e.g., the bus 110, the processor 120, the memory 130, etc.) of the electronic device 101, and process the one or more work requests. The API 145 is, for example, an interface of enabling the application program 147 to control a function of the kernel 141 or the middleware 143, and can, for example, include at least one interface or function (e.g., instruction) for file control, window control, picture processing, character control, etc.

The input output interface 150 can, for example, play a role of an interface capable of forwarding an instruction or data inputted from a user or another external device, to the other constituent element(s) of the electronic device 101.

The display 160 can, for example, include a Liquid Crystal Display (LCD), a Light Emitting Diode (LED) display, an Organic Light Emitting Diode (OLED) display, or a Microelectromechanical Systems (MEMS) display, or an electronic paper display. The display 160 can, for example, display various contents (e.g., a text, an image, a video, an icon, a symbol, etc.) for a user. The display 160 can include a touch screen and, for example, can receive a touch, gesture, proximity, or hovering input that uses an electronic pen or a part of the user's body.

The communication interface 170 can, for example, establish communication between the electronic device 101 and an external device (e.g., a 1st external electronic device 102, a 2nd external electronic device 104, or a server 106). For example, the communication interface 170 can be coupled to a network 162 through a wireless communication or wired communication, and communicate with the external device (e.g., the 2nd external electronic device 104 or server 106).

The wireless communication can, for example, include a cellular communication that uses at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc. In addition, the wireless communication may include, for example, short range communication 164. According to one embodiment, the wireless communication can, for example, include at least one of Wireless Fidelity (WiFi), Bluetooth® (BT), Bluetooth Low Energy (BLE), Zigbee, Near Field Communication (NFC), Magnetic Secure Transmission (MST), Radio Frequency (RF), or Body Area Network (BAN). According to one embodiment, the wireless communication can include GNSS. The GNSS can, for example, be a Global Positioning System (GPS), a Global navigation satellite system)(Glonass®, Beidou® (Beidou navigation satellite system), or Galileo® (the European global satellite-based navigation system). In the present document below, the "GPS" can be used interchangeably with the "GNSS". The wired communication can, for example, include at least one of a Universal Serial Bus (USB), a High Definition Multimedia Interface (HDMI), a Recommended Standard-232 (RS-232), a Power Line Communication (PLC), a Plain Old Telephone Service (POTS), etc. The network 162 can include at least one of a telecommunications network, for example, a computer network (e.g., Local Area Network (LAN) or Wide Area Network (WAN)), the Internet, or a telephone network.

The first and second external electronic devices 102 and 104 each can be a device of a type identical with or different from that of the electronic device 101. According to various embodiments, all or some of operations executed in the electronic device 101 can be executed in another or a plurality of electronic devices (e.g., the electronic device 102, 104 or the server 106). According to one embodiment, in examples where the electronic device 101 performs any function or service in an automatic manner or in response to a request, the electronic device 101 can request at least a partial function associated with this to another device (e.g., the electronic device 102, 104 or the server 106), instead of or additionally to executing the function or service in itself. The other electronic device (e.g., the electronic device 102, 104 or the server 106) can execute the requested function or additional function, and forward the result to the electronic device 101. The electronic device 101 can process the received result as it is or additionally, and provide the requested function or service. For this, a cloud computing, distributed computing, or client-server computing technology can be used, for example.

FIG. 1B illustrates a block diagram of an electronic device according to various embodiments of the present disclosure.

Referring to FIG. 1B, the electronic device 101 can include the processor 120, the input output interface 150 and the display 160 which are operatively coupled with one another.

According to one embodiment, the input output interface 150 can include an image acquisition module 151 and an input module 153.

According to one embodiment, the image acquisition module 151 can acquire an image for applying a virtual lighting effect. For example, the image acquisition module 151 can acquire an image (or picture) of a subject. The image acquisition module 151 can perform image processing for the image of the subject. For instance, the image acquisition module 151 can process an image into an image suitable for recognition (e.g., contrast increase), or process the image into an image suitable for photographing (e.g., noise, definiteness processing), or process the image into an image to which an image effect is applied (e.g., face slender, a skin whitening effect, etc.). For example, the image acquisition module 151 can acquire an image (or picture) from an external device through the communication interface 170. For example, the image acquisition module 151 can extract an image (or picture) stored in the memory 130.

According to one embodiment, the input module 153 can detect an input of supplementary information necessary for determining a virtual lighting effect. For example, the input module 153 can include a touch screen, a pen, a gyro sensor, an acceleration sensor, an illumination sensor, etc.

According to one embodiment, the processor 120 can include an object detection module 121, a normal map determination module 123, a lighting effect determination module 125, and an image synthesis module 127.

According to one embodiment, the object detection module 121 can detect at least one of a position and size of an object (e.g., eyes, a noise, a mouth, a contour, etc.) from a face included in an image acquired from the image acquisition module 151. For example, the object detection module 121 can perform a face detection algorithm or face tracking algorithm for the image acquired from the image acquisition module 151 and check the existence or non-existence of a face region. In examples where the face region is included in the image, the object detection module 121 can extract feature points (e.g., eyes, a noise, a mouth, eyebrows, a contour, etc.) of the corresponding face region.

According to one embodiment, the normal map determination module 123 can determine a normal map corresponding to a face included in an image. For example, the normal map determination module 123 can detect the pose (e.g., angle) of the face, based on feature points of the face included in the image. For instance, the pose of the face can be extracted based on an up/down ratio of the face, a left/right ratio thereof, and a distance between the feature points of the face. The normal map determination module 123 can determine a normal map corresponding to the pose of the face, based on a plurality of reference normal maps stored in the memory 130. For instance, the normal map determination module 123 can generate a normal map corresponding to the pose of the face included in the image, through interpolation of using reference normal maps stored in the memory 130. For instance, the normal map determination module 123 can choose a reference normal map corresponding to the pose of the face included in the image, among the reference normal maps stored in the memory 130.

According to one embodiment, the normal map determination module 123 can update a normal map corresponding to the pose of a face, based on a feature point of the face included in an image. For example, the normal map determination module 123 can detect a position difference of the feature point of the face included in the image and a feature point of a normal map corresponding to the feature point of the face. The normal map determination module 123 can update the normal map to correspond to the position difference of the feature points. For instance, the position difference of the feature points can include a difference of distance between feature points of the face.

According to one embodiment, the normal map determination module 123 can update a normal map corresponding to the pose of a face, based on a facial area weight. For example, the normal map determination module 123 can update a normal vector by facial area in the normal map corresponding to the pose of the face, based on a preset area weight. For instance, the normal map determination module 123 can update a normal vector of each pixel included in a corresponding area by facial area to correspond to a weight.

According to one embodiment, the lighting effect determination module 125 can determine an attribute of a virtual lighting effect that will be applied to an image, based on virtual light source information and a normal map corresponding to the pose of a face included in the image. For example, the lighting effect determination module 125 can set light source information (e.g., a position, a quantity of light, a color, a type, etc.) of a preference picture that is chosen by a user, as a virtual light source of the image. For example, the lighting effect determination module 125 can generate a virtual light source variable for changing an attribute of a pixel included in the image, based on the virtual light source information (e.g., the position of the virtual light source, the quantity of light thereof, the color thereof, etc.) of the image and the normal map corresponding to the pose of the face. For example, the lighting effect determination module 125 can generate a virtual lighting effect model (e.g., a virtual lighting effect image), based on the virtual light source information (e.g., the position of the virtual light source, the quantity of light thereof, the color thereof, etc.) of the image and the normal map corresponding to the pose of the face.

According to one embodiment, the image synthesis module 127 can apply a virtual lighting effect to an image acquired from the image acquisition module 151, based on an attribute of the virtual lighting effect determined in the lighting effect determination module 125. For example, the image synthesis module 127 can adjust an attribute (e.g., brightness, color, etc.) of each pixel included in the image to correspond to a virtual light source variable determined in the lighting effect determination module 125, and apply the virtual lighting effect to the image. For example, the image synthesis module 127 can synthesize a virtual lighting effect model determined in the lighting effect determination module 125 and using the image acquired from the image acquisition module 151, and apply the virtual lighting effect to the image.

According to one embodiment, the display 160 can display an image to which a virtual lighting effect is applied by the image synthesis module 127. For example, the display 160 can display a preview image to which the virtual lighting effect is applied by the image synthesis module 127.

According to one embodiment, the memory 130 of FIG. 1A can store an image to which a virtual lighting effect is applied by the processor 120. For example, the memory 130 can store the image to which the virtual lighting effect is applied so that the image may be distinguished from the original image. For example, the memory 130 can update the original image into the image to which the virtual lighting effect is applied, and store the updated image.

According to one embodiment, a reference normal map stored in the electronic device 101 can be generated based on people's average face information, or can be generated based on face information on a user of the electronic device 101. For example, if a reference normal map generation event takes place, the processor 120 can enable a camera module (e.g., the image acquisition module 121). The processor 120 can generate at least one reference normal map, based on at least one user's face image acquired through the camera module. Additionally or alternatively, if the reference normal map generation event takes place, the processor 120 can control the display 160 to display a reference normal map generation screen. For instance, the reference normal map generation screen can include a guide message of photographing at least one user image for the sake of reference normal map generation. For example, the processor 120 can generate at least one reference normal map, based on at least one user's face image stored in the memory 130 as well.

According to various embodiments of the present disclosure, the electronic device 101 can include at least some of the object detection module 121, the normal map determination module 123, the lighting effect determination module 125 and the image synthesis module 127 that are included in the processor 120, as separate modules different from the processor 120 as well.

Figure 2:
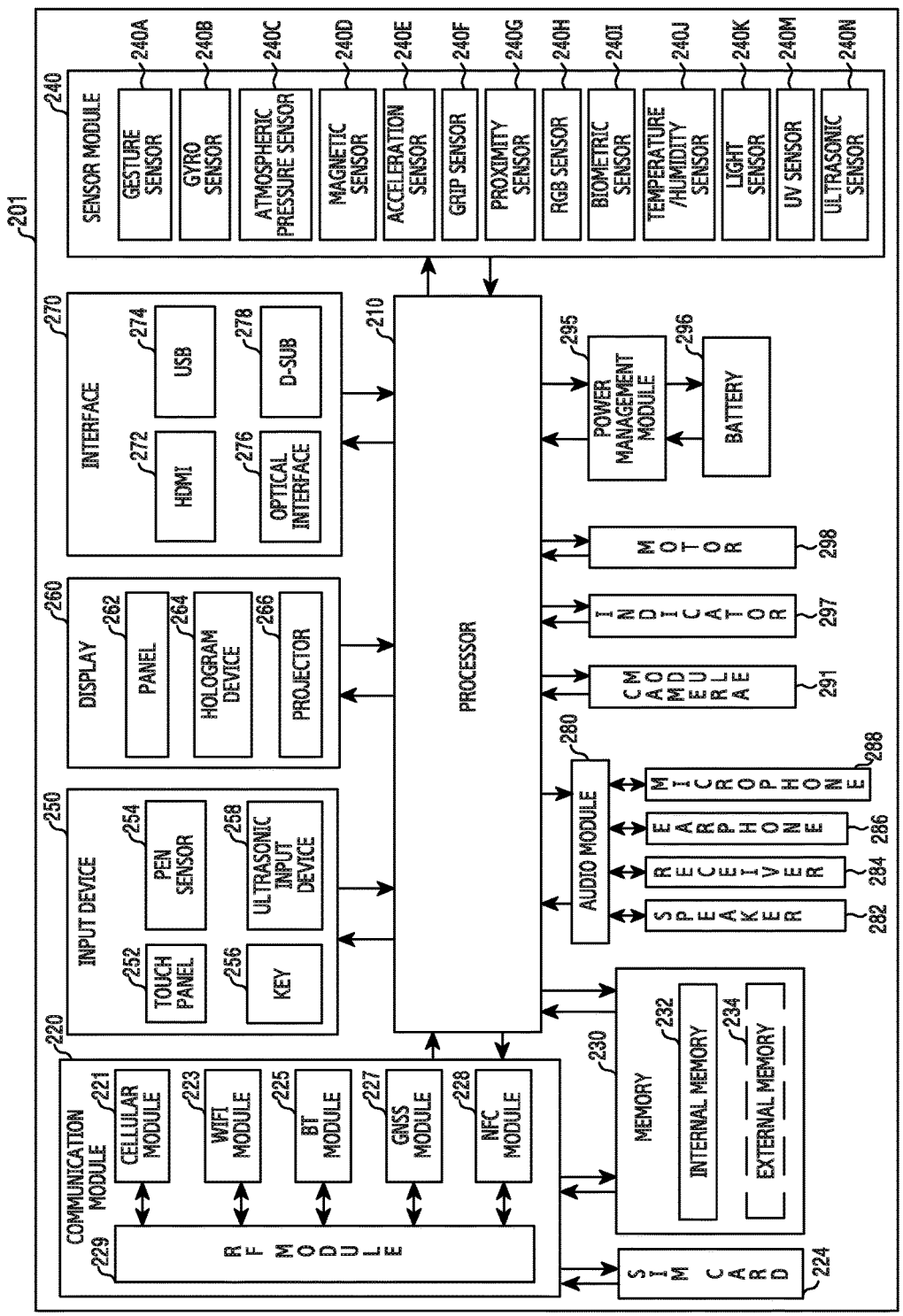
FIG. 2 illustrates a block diagram of an electronic device according to various embodiments of the present disclosure.

FIG. 2 illustrates a block diagram of an electronic device 201 according to various embodiments. The electronic device 201 can, for example, include the entire or part of the electronic device 101 illustrated in FIG. 1A. The electronic device 201 can include one or more processors (e.g., an Application Processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 can, for example, drive an operating system or an application program and control a plurality of hardware or software constituent elements coupled to the processor 210, and can perform various data processing and operations. The processor 210 can be, for example, implemented as a System On Chip (SoC). According to one embodiment, the processor 210 can further include a Graphical Processing Unit (GPU) and/or an Image Signal Processor (ISP). The processor 210 can include at least some (e.g., the cellular module 221) of the constituent elements illustrated in FIG. 2 as well. The processor 210 can load an instruction or data received from at least one of the other constituent elements (e.g., non-volatile memory), to a volatile memory and process the loaded instruction or data, and store the result data in the non-volatile memory.

According to one embodiment, the processor 210 can apply a virtual lighting effect to an image acquired in the electronic device 201, based on a normal map corresponding to the image acquired in the electronic device 201. For instance, the processor 210 can generate a normal map corresponding to the pose of a face included in the image, based on a plurality of reference normal maps stored in the memory 230.

The communication module 220 can have the same or similar construction with the communication interface 170 of FIG. 1A. The communication module 220 can, for example, include a cellular module 221, a WiFi module 223, a Bluetooth® (BT) module 225, a GNSS module 227, an NFC module 228, and an RF module 229.

The cellular module 221 can, for example, provide voice telephony, video telephony, a text service, an Internet service, etc., through a telecommunication network. According to one embodiment, the cellular module 221 can perform the distinction and authentication of the electronic device 201 within the telecommunication network, using the subscriber identification module (e.g., SIM card) 224. According to one embodiment, the cellular module 221 can perform at least some functions among functions the processor 210 can provide. According to one embodiment, the cellular module 221 can include a Communication Processor (CP).

According to any embodiment, at least some (e.g., two or more) of the cellular module 221, the WiFi module 223, the Bluetooth® (BT) module 225, the GNSS module 227 or the NFC module 228 can be included within one Integrated Chip (IC) or IC package.

The RF module 229 can, for example, transceive a communication signal (e.g., an RF signal). The RF module 229 can, for example, include a transceiver, a Power Amplifier Module (PAM), a frequency filter, a Low Noise Amplifier (LNA), an antenna, etc. According to another embodiment, at least one of the cellular module 221, the WiFi module 223, the Bluetooth® module 225, the GNSS module 227 or the NFC module 228 can transceive an RF signal through the separate RF module 229. The subscriber identification module 224 can, for example, include a card including a subscriber identification module and/or an embedded SIM, and can include unique identification information (e.g., an Integrated Circuit Card Identifier (ICCID)) or subscriber information (e.g., an International Mobile Subscriber Identity (IMSI)).

The memory 230 (e.g., the memory 130 of FIG. 1A) can, for example, include an internal memory 232 or an external memory 234. The internal memory 232 can, for example, include at least one of a volatile memory (e.g., a DRAM, an SRAM, an SDRAM, etc.), a non-volatile memory (e.g., One Time Programmable ROM (OTPROM), a PROM, an EPROM, an EEPROM, a mask ROM, a flash ROM, a flash memory), a hard drive, or a Solid State Drive (SSD). The external memory 234 can include a flash drive, for example, a Compact Flash (CF), a Secure Digital (SD), a micro-SD, a mini-SD, an extreme Digital (xD), a Multi Media Card (MMC), a memory stick, etc. The external memory 234 can be operatively or physically coupled with the electronic device 201 through various interfaces.

The sensor module 240 can, for example, measure a physical quantity or sense an enable state of the electronic device 201, and convert measured or sensed information into an electric signal. The sensor module 240 can, for example, include at least one of a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, or an Ultra Violet (UV) sensor 240M. Additionally or alternatively, the sensor module 240 can, for example, include an E-nose sensor, an Electromyography (EMG) sensor, an Electroencephalogram (EEG) sensor, an Electrocardiogram (ECG) sensor, an InfraRed (IR) sensor, an iris scan sensor, and/or a finger scan sensor. The sensor module 240 can further include a control circuit for controlling at least one or more sensors belonging therein. In any embodiment, the electronic device 201 can further include a processor configured to control the sensor module 240, as a part of the processor 210 or separately from the processor 210, and control the sensor module 240 while the processor 210 is in a sleep state.

The input device 250 can, for example, include a touch panel 252, a (digital) pen sensor 254, a key 256, or an ultrasonic input device 258. The touch panel 252 can, for example, use at least one scheme among a capacitive overlay scheme, a pressure sensitive scheme, an infrared beam scheme, or an ultrasonic scheme. Also, the touch panel 252 can further include a control circuit as well. The touch panel 252 can further include a tactile layer and provide a tactile response to a user. The (digital) pen sensor 254 can, for example, be a part of the touch panel 252 or include a separate sheet for recognition. The key 256 can, for example, include a physical button, an optical key, or a keypad. The ultrasonic input device 258 can sense an ultrasonic wave generated in an input tool, through a microphone (e.g., a microphone 288), and check data corresponding to the sensed ultrasonic wave.

The display 260 (e.g., the display 160 of FIG. 1A) can include a panel 262, a hologram device 264, a projector 266, and/or a control circuit for controlling them. The panel 262 can, for example, be implemented to be flexible, transparent, or wearable. The panel 262 can be constructed as one or more modules with the touch panel 252. The hologram device 264 can show a three-dimensional picture to the air, using an interference of light. The projector 266 can project light on a screen and display a picture. The screen can, for example, be situated inside or outside the electronic device 201. The interface 270 can, for example, include an HDMI 272, a USB 274, an optical interface 276, or a D-subminiature (D-sub) 278. The interface 270 can, for example, be included in the communication interface 170 illustrated in FIG. 1A. Additionally or alternatively, the interface 270 can, for example, include a Mobile High-definition Link (MHL) interface, an SD card/Multi Media Card (MMC) interface, or an Infrared Data Association (IrDA) standard interface.

The audio module 280 can, for example, convert a sound and an electric signal interactively. At least some constituent elements of the audio module 280 can, for example, be included in the input output interface 150 illustrated in FIG. 1A. The audio module 280 can, for example, process sound information inputted or outputted through a speaker 282, a receiver 284, an earphone 286, the microphone 288, etc. The camera module 291 is, for example, a device able to photograph a still picture and a moving picture. According to one embodiment, the camera module 291 can include one or more image sensors (e.g., a front sensor or a rear sensor), a lens, an Image Signal Processor (ISP), or a flash (e.g., a Light Emitting Diode (LED), a xenon lamp, etc.). The power management module 295 can, for example, manage the electric power of the electronic device 201. According to one embodiment, the power management module 295 can include a Power Management Integrated Circuit (PMIC), a charger IC, or a battery or fuel gauge. The PMIC can, for example, employ a wired and/or wireless charging method. The wireless charging method can, for example, include a magnetic resonance scheme, a magnetic induction scheme, an electromagnetic wave scheme, etc., and further include a supplementary circuit for wireless charging, for example, a coil loop, a resonance circuit, a rectifier, etc. The battery gauge can, for example, measure a level of the battery 296, a voltage being in charge, a current, or a temperature. The battery 296 can, for example, include a rechargeable battery and/or a solar battery.

The indicator 297 can display a specific state of the electronic device 201 or a part (e.g., the processor 210) thereof, for example a booting state, a message state, a charging state, etc. The motor 298 can convert an electric signal into a mechanical vibration, and can generate a vibration, a haptic effect, etc. The electronic device 201 can, for example, include a mobile TV support device (e.g., a GPU) capable of processing media data complying with the standards of Digital Multimedia Broadcasting (DMB), Digital Video Broadcasting (DVB), MediaFlo®, etc. The constituent elements described in the present document each can consist of one or more components, and the constituent element can have a different name according to the kind of an electronic device. In various embodiments, the electronic device (e.g., the electronic device 201) can omit some constituent elements, or further include additional constituent elements, or combine and construct some of the constituent elements as one entity but perform the same function as the corresponding constituent elements before combination.

Figure 3:
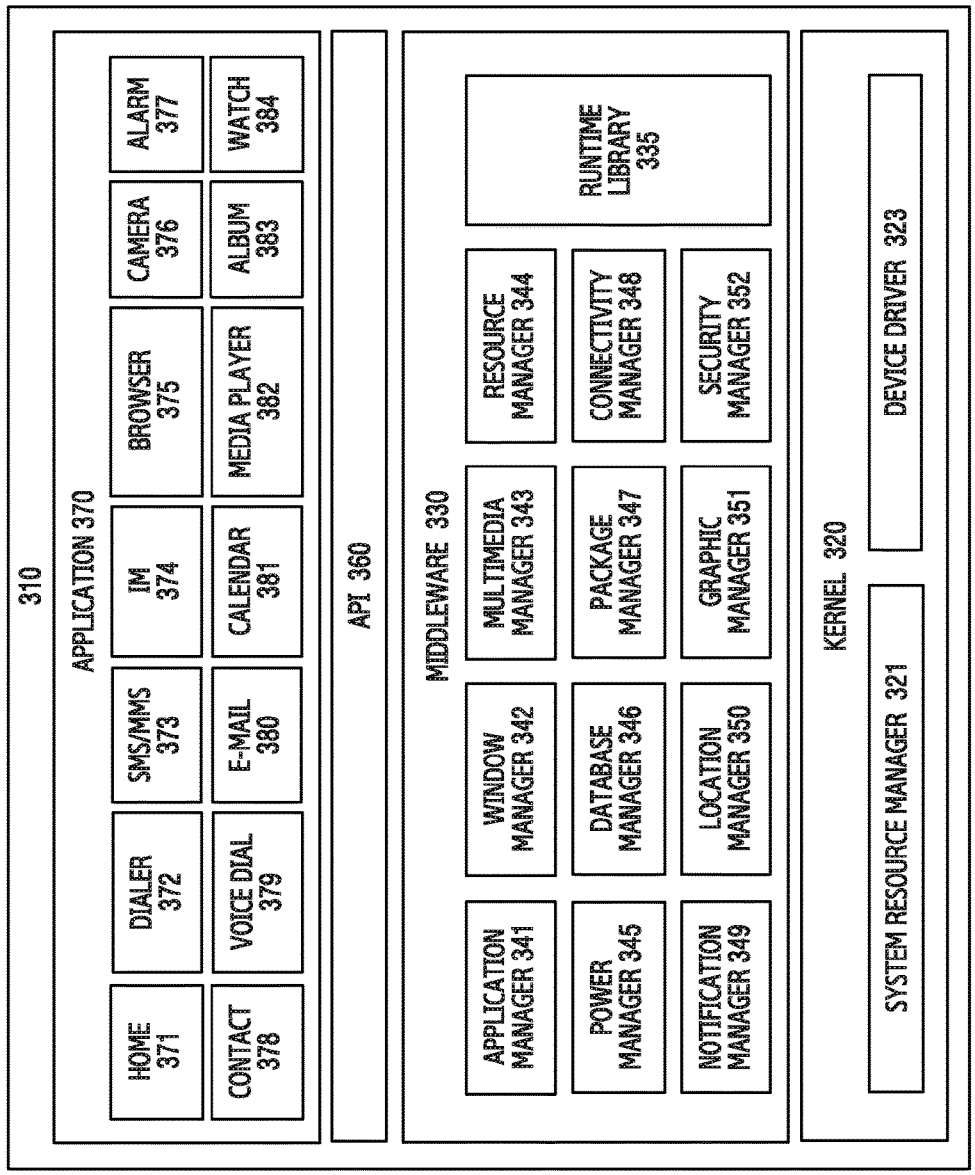
FIG. 3 illustrates a block diagram of a program module according to various embodiments of the present disclosure.

FIG. 3 illustrates a block diagram of a program module according to various embodiments. According to one embodiment, the program module 310 (e.g., the program 140) can include an Operating System (OS) controlling resources related to an electronic device (e.g., the electronic device 101), and/or various applications (e.g., the application program 147) run on the operating system. The operating system can, for example, include Android™, iOS™, Windows™, Symbian™, Tizen™, or Bada™.

Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least some of the program module 310 can be preloaded onto an electronic device, or can be downloaded from an external electronic device (e.g., the electronic device 102, 104, the server 106, etc.).

The kernel 320 can, for example, include a system resource manager 321 and/or a device driver 323. The system resource manager 321 can perform the control of system resources, the allocation thereof, or the recovery thereof. According to one embodiment, the system resource manager 321 can include a process management unit, a memory management unit, or a file system management unit. The device driver 323 can, for example, include a display driver, a camera driver, a Bluetooth driver, a shared memory driver, a USB driver, a keypad driver, a WiFi driver, an audio driver, or an Inter-Process Communication (IPC) driver. The middleware 330 can, for example, provide a function that the application 370 commonly needs, or provide various functions to the application 370 through the API 360 so that the application 370 may make use of restricted system resources within an electronic device. According to one embodiment, the middleware 330 can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 can, for example, include a library module that a compiler uses so as to add a new function through a programming language while the application 370 is executed. The runtime library 335 can perform input output management, memory management, or arithmetic function processing. The application manager 341 can, for example, manage a lifecycle of the application 370. The window manager 342 can manage a GUI resource that is used in a screen. The multimedia manager 343 can determine a format required for playing of media files, and perform the encoding or decoding of the media file by using a codec suitable for the corresponding format. The resource manager 344 can manage a source code of the application 370 or a space of a memory. The power manager 345 can, for example, manage a battery capacity or a power source, and provide power information required for an operation of an electronic device. According to one embodiment, the power manager 345 can interwork with a Basic Input/Output System (BIOS). The database manager 346 can, for example, generate, search or change a database that will be used in the application 370. The package manager 347 can manage the installation or updating of an application distributed in a form of a package file.

The connectivity manager 348 can, for example, manage wireless connectivity. The notification manager 349 can, for example, provide events such as an arrival message, an appointment, a proximity notification, etc. to a user. The location manager 350 can, for example, manage location information of an electronic device. The graphic manager 351 can, for example, manage a graphic effect that will be provided to the user, or a user interface related with this. The security manager 352 can, for example, provide system security or user authentication. According to one embodiment, the middleware 330 can include a telephony manager for managing a voice or video telephony function of the electronic device, or a middleware module capable of forming a combination of functions of the aforementioned constituent elements. According to one embodiment, the middleware 330 can provide a module that is specialized by operating system type. The middleware 330 can dynamically delete some of the existing constituent elements or add new constituent elements. The API 360 is, for example, a set of API programming functions, and can be provided to have another construction in accordance with an operating system. For example, Android or iOS can provide one API set by platform, and Tizen can provide two or more API sets by platform.

The application 370 can, for example, include a home 371, a dialer 372, a Short Message Service (SMS)/Multimedia Message Service (MMS) 373, an Instant Message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar, etc.), or an environment information (e.g., air pressure, humidity, temperature information) provision application. According to one embodiment, the application 370 can include an information exchange application capable of supporting information exchange between an electronic device and an external electronic device. The information exchange application can, for example, include a notification relay application for relaying specific information to the external electronic device, or a device management application for managing the external electronic device. For example, the notification relay application can relay notification information, which is generated in another application of the electronic device, to the external electronic device, or can receive notification information from the external electronic device and provide the received notification information to a user. The device management application can, for example, install, delete, or update a function (e.g., the turn-on/turn-off of the external electronic device itself or some constituent components thereof or the adjustment of a brightness or resolution of a display) of the external electronic device communicating with the electronic device, or an application operating in the external electronic device. According to one embodiment, the application 370 can include an application (e.g., a health care application of a mobile medical instrument) designated according to an attribute of the external electronic device. According to one embodiment, the application 370 can include an application received from the external electronic device. At least a part of the program module 310 can be implemented (e.g., executed) by software, firmware, hardware (e.g., the processor 210) or a combination of at least two or more of them, and can include a module for performing one or more functions, a program, a routine, sets of instructions, or a process.

According to various embodiments of the present disclosure, an electronic device can include a display, a memory storing a 1st normal map and a 2nd normal map that correspond to a face, and at least one processor. The at least one processor can be set to acquire an image, detect a face region from the image, determine a normal map corresponding to at least a partial region of the face region on at least the basis of the 1st normal map and the 2nd normal map, and display the image on the display in a state in which a virtual lighting effect is applied to the at least partial region or a peripheral region thereof, on at least the basis of the determined normal map.

According to various embodiments, the processor can be set to detect the pose of the face included in the image, and generate a normal map corresponding to the pose of the face on the basis of the 1st normal map and the 2nd normal map.

According to various embodiments, the processor can be set to generate the normal map corresponding to the pose of the face through interpolation of using the 1st normal map and the 2nd normal map.

According to various embodiments, the processor can be set to detect the pose of the face included in the image, and choose any one normal map corresponding to the pose of the face among the 1st normal map and the 2nd normal map.

According to various embodiments, the processor can be set to determine the normal map corresponding to the at least partial region of the face region detected from the image on the basis of the 1st normal map and the 2nd normal map, and update the determined normal map, based on a facial area weight.

According to various embodiments, the processor can be set to determine the normal map corresponding to the at least partial region of the face region detected from the image on the basis of the 1st normal map and the 2nd normal map, and update the determined normal map, based on a position difference of a feature point of the determined normal map and a feature point of the face region detected from the image.

According to various embodiments, if a facial area weight is set, the 1st normal map and the 2nd normal map can be updated based on the facial area weight.

According to various embodiments, the processor can be set to detect virtual light source information, apply a virtual lighting effect to at least a part of the face region included in the image, based on the virtual light source information and the determined normal map, and display the image to which the virtual lighting effect is applied, on the display.

According to various embodiments, the processor can be set to detect light source information of a preference picture, and set the light source information of the preference picture as the virtual light source information.

According to various embodiments, the virtual light source information can include at least one of a position of a virtual light source, a quantity of light, a color, and a type.

Figure 4:
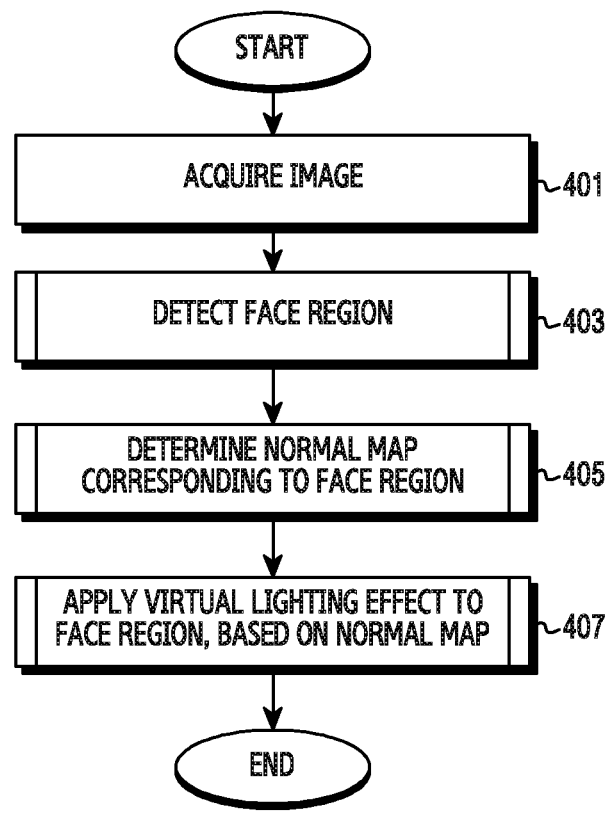
FIG. 4 illustrates a flowchart for applying a virtual lighting effect in an electronic device according to various embodiments of the present disclosure.

FIG. 4 illustrates a flowchart for applying a virtual lighting effect in an electronic device according to various embodiments of the present disclosure. In the following description, the electronic device can include the electronic device 101 of FIG. 1A and FIG. 1B or the processor 120 of the electronic device 101.

Referring to FIG. 4, in operation 401, the electronic device can acquire an image. For example, the processor 120 can acquire an image of a subject by photographing the subject through the image acquisition module 151 (e.g., camera module) of the electronic device 101. For example, the processor 120 can acquire an image from an external device on the basis of diverse communication schemes such as a wired communication, a wireless communication, etc. For example, the processor 120 can extract an image for applying the virtual lighting effect out of a plurality of images stored in the memory 130. For instance, the image can include two-dimensional data or three-dimensional data.

In operation 403, the electronic device can detect a face region of the subject from the image. For example, the processor 120 can check if a face is detected from an image acquired in the electronic device 101, through a face detection algorithm or face tracking algorithm for the corresponding image. If the face is detected from the image, the processor 120 can detect feature points of eyes, a nose, a mouth, eyebrows, a contour, etc. or a skin tone from the face region included in the image. Additionally or alternatively, the processor 120 can detect the pose (e.g., angle) of the face included in the image, based on the feature points of the face.

In operation 405, the electronic device can determine a normal map corresponding to the face region included in the image. For example, the processor 120 can check if a reference normal map corresponding to the pose of the face included in the image exists in the memory 130. If the reference normal map corresponding to the pose of the face included in the image exists, the processor 120 can choose the corresponding reference normal map. If the reference normal map corresponding to the pose of the face included in the image does not exist, the processor 120 can generate a normal map corresponding to the pose of the face, based on a plurality of reference normal maps. For instance, the processor 120 can generate the normal map corresponding to the pose of the face by means of interpolation of using the plurality of reference normal maps. Additionally or alternatively, the processor 120 can update the normal map corresponding to the pose of the face, based on the feature points of the face or a facial area weight.

In operation 407, the electronic device can apply a virtual lighting effect to the corresponding image, based on the normal map corresponding to the face region included in the image. For example, the processor 120 can apply the virtual lighting effect to the face region included in the image, based on virtual light source information (e.g., a position, a quantity of light, a color, a type, etc.) and the normal map corresponding to the face region. For instance, the processor 120 can adjust an attribute (e.g., brightness, color) of each pixel included in the face region of the image to correspond to the virtual light source information and the normal map, and apply the virtual lighting effect to the image.

According to one embodiment, the electronic device can detect the face region included in the image, using various face detection algorithms such as Principal Component Analysis (PCA) using eigenface, Linear Discriminate Analysis (LDA), elastic bunch graph matching, hidden markov model, multilinear subspace learning that uses tenser expression, neuronal motivated dynamic link matching, etc.

According to one embodiment, the electronic device can detect the face region included in the image, using various face detection programs such as a digiKam program, an iPhoto program, an OpenCV program, a Photoshop Elements program, a Picasa program, a Picture Motion Browser program, a Windows Live Photo Gallery program, etc.

Figure 5:
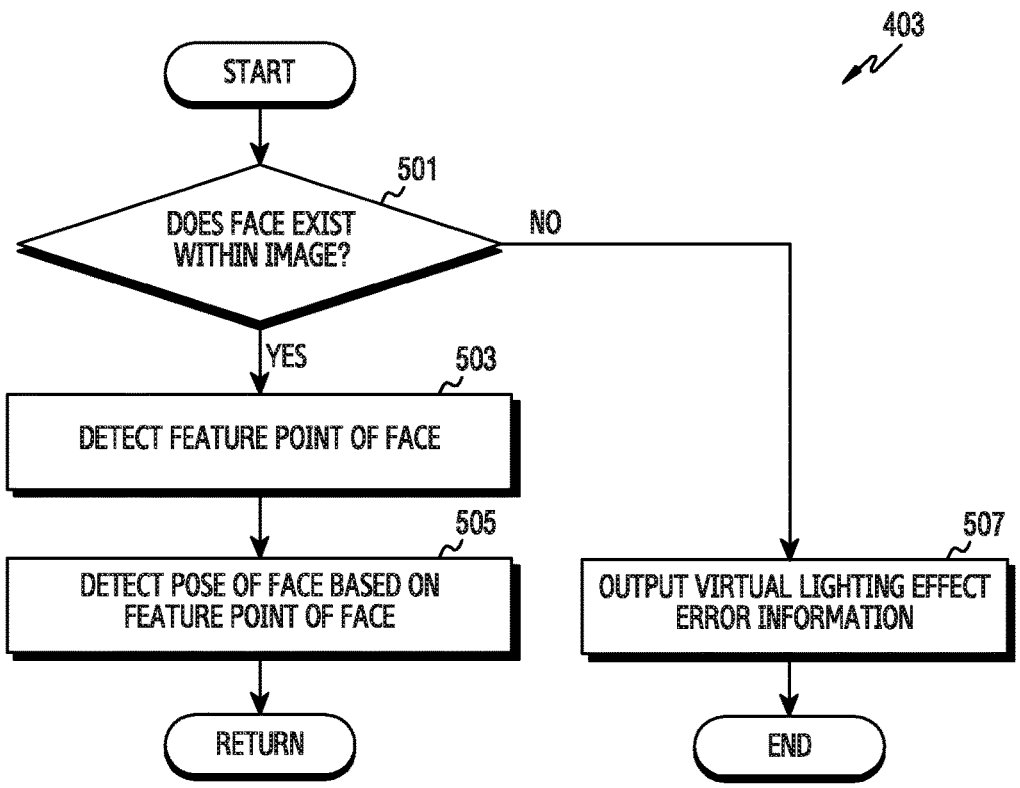
FIG. 5 illustrates a flowchart for detecting a face region in an electronic device according to various embodiments of the present disclosure.
Figure 6A:
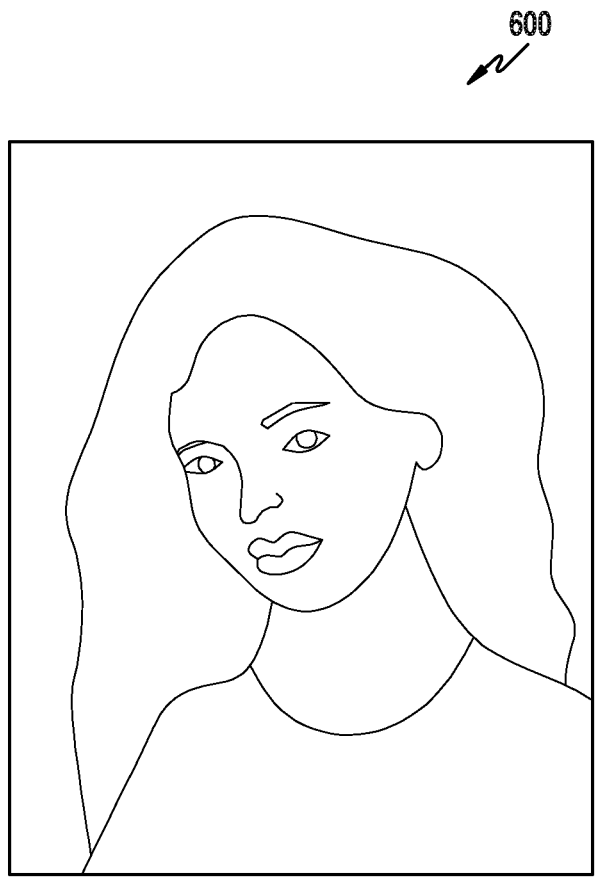
FIG. 6A to FIG. 6C illustrate conceptual diagrams for detecting a face region in an electronic device according to various embodiments of the present disclosure.
Figure 6B:
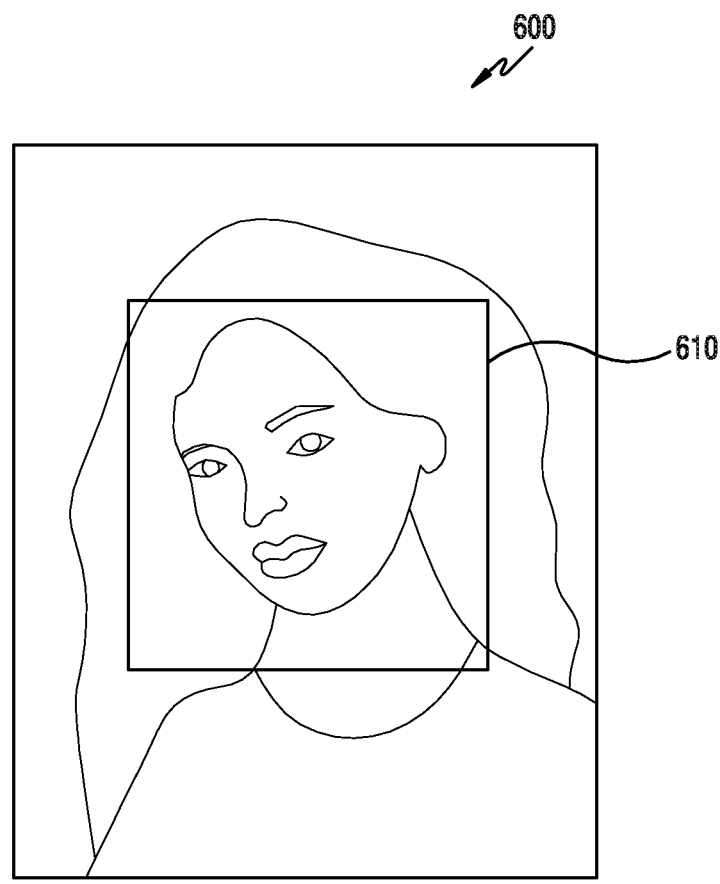
Figure 6C:
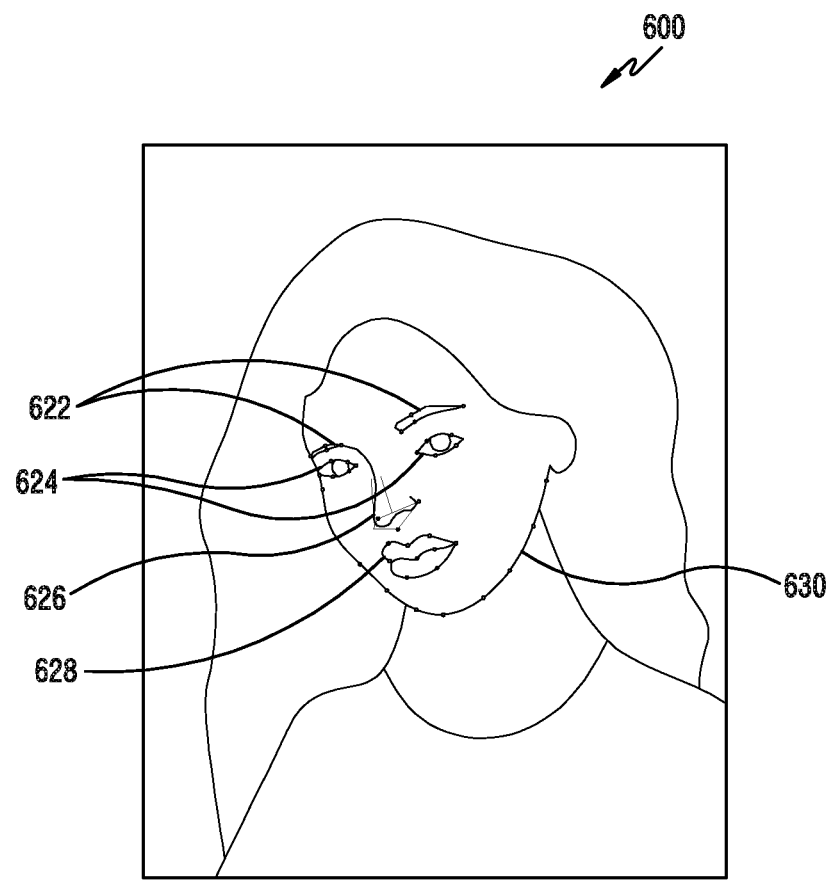

FIG. 5 illustrates a flowchart for detecting a face region in an electronic device according to various embodiments of the present disclosure. The following description is made for operation 403 of FIG. 4 for detecting the face region, using conceptual diagrams of FIG. 6A to FIG. 6C. FIG. 6A to FIG. 6C illustrate the conceptual diagrams for detecting the face region in the electronic device according to various embodiments of the present disclosure. In the following description, the electronic device can include the electronic device 101 of FIG. 1A and FIG. 1B or the processor 120 of the electronic device 101.

Referring to FIG. 5, if selecting an image to apply a virtual lighting effect (e.g., operation 401 of FIG. 4) in operation 501, the electronic device can check if a face of a subject is included in the corresponding image. For example, as in FIG. 6A, the processor 120 can acquire an image 600 to apply the virtual lighting effect. The processor 120 can check if a face region 610 is detected from the image 600 as in FIG. 6B, through a face detection algorithm or a face tracking algorithm.

If the face of the subject is included in the image, in operation 503, the electronic device can detect a feature point of the face included in the image. For example, the processor 120 can extract at least one object configuring the face, based on various features such as an edge of a face region included in the image, a corner thereof, a blob thereof, a ridge thereof, a scale-invariant feature thereof, a color thereof, etc. For instance, the processor 120 can detect feature points of eyebrows 622, eyes 624, a nose 626, a mouth 628 and a contour 630, included in the face, as in FIG. 6C.

In operation 505, the electronic device can detect the pose of the face included in the image, based on the feature points of the face extracted from the image. For example, the processor 120 can detect the pose of the face included in the image, using a geometrical relationship (e.g., a size ratio) such as a position of at least one object included in the face, a distance thereof, an angle thereof, an area thereof, etc. For instance, in examples where a distance of feature points of a left eye region of the face is larger than a distance of feature points of a right eye region, the processor 120 can recognize that it is a state in which a left region of the face is closer to the electronic device 101 than a right region, and determine that the face heads to the right. For example, the processor 120 can analyze a shape of a 'T' zone consisting of eyes, a nose, and a mouth in a face region, and estimate an up/down direction of the face.

If the face region is not detected from the image to apply the virtual lighting effect, in operation 507, the electronic device can determine that it cannot apply the virtual lighting effect. Accordingly, the electronic device can output virtual lighting effect error information. For example, if the electronic device is not able to detect the face region for applying the virtual lighting effect from the image acquired in operation 401 of FIG. 4, the processor 120 can control the display 160 to display a virtual lighting effect error occurrence message. Additionally or alternatively, the processor 120 can output the virtual lighting effect error information to the external, using various output elements such as a sound, a light source, a vibration, etc.

Figure 7:
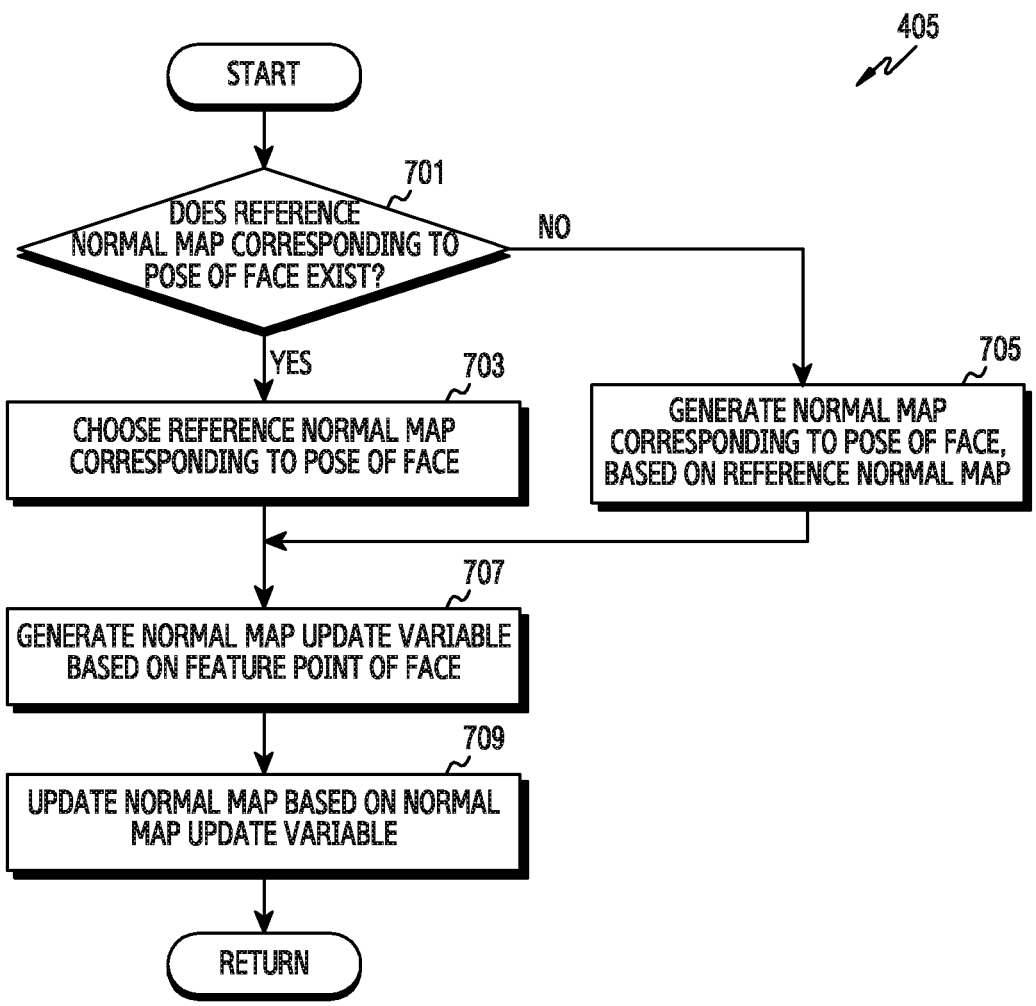
FIG. 7 illustrates a flowchart for determining a normal map corresponding to a face region in an electronic device according to various embodiments of the present disclosure.
Figure 8C:
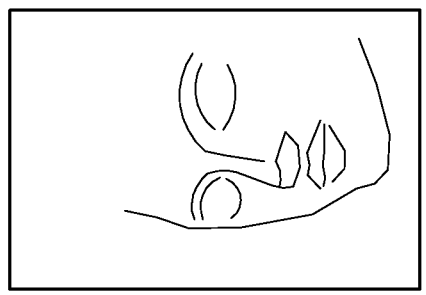
FIG. 8A to FIG. 8C illustrate a conceptual diagram for generating a normal map corresponding to a face region in an electronic device according to various embodiments of the present disclosure.
Figure 8B:
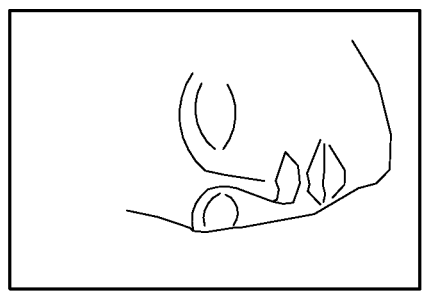
Figure 8A:
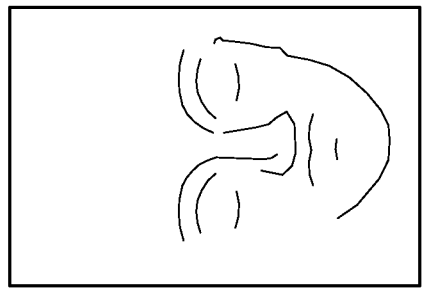
Figure 9C:
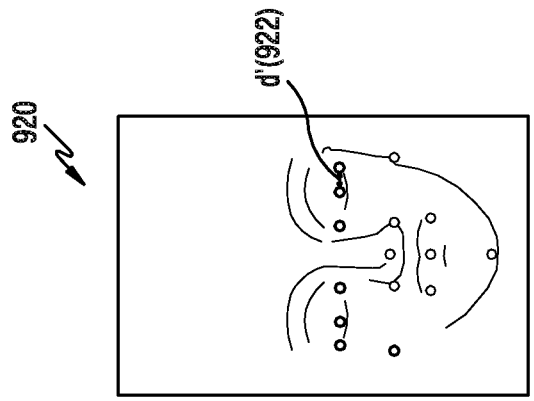
FIG. 9A to FIG. 9C illustrate a conceptual diagram for updating a normal map to correspond to an image in an electronic device according to various embodiments of the present disclosure.
Figure 9B:
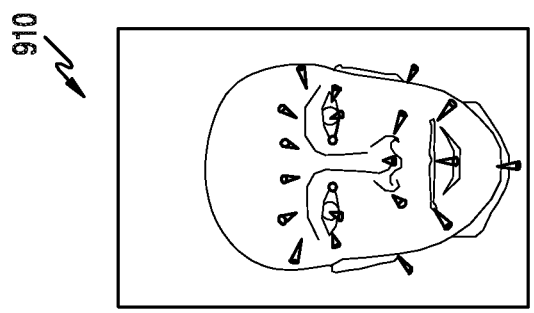
Figure 9A:
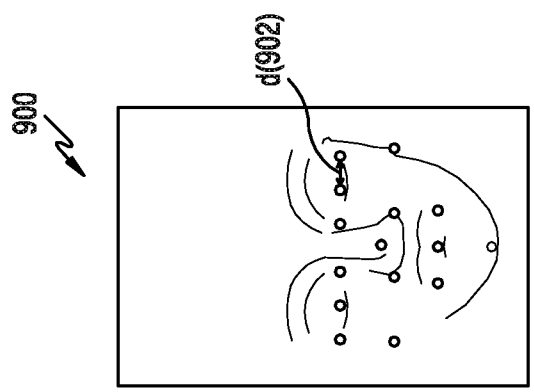

FIG. 7 illustrates a flowchart for determining a normal map corresponding to a face region in an electronic device according to various embodiments of the present disclosure. The following description is made for operation 405 of FIG. 4 for determining the normal map corresponding to the face region, using conceptual diagrams of FIG. 8A to FIG. 9C. FIG. 8A to FIG. 8C illustrate the conceptual diagram for generating the normal map corresponding to the face region in the electronic device according to various embodiments of the present disclosure. FIG. 9A to FIG. 9C illustrate the conceptual diagram for updating the normal map to correspond to an image in the electronic device according to various embodiments of the present disclosure. In the following description, the electronic device can include the electronic device 101 of FIG. 1A and FIG. 1B or the processor 120 of the electronic device 101.

Referring to FIG. 7, if detecting a face region from an image to apply a virtual lighting effect (e.g., operation 403 of FIG. 4), in operation 701, the electronic device can check if a reference normal map corresponding to the pose of a face included in the image exists. For example, the processor 120 can check if a reference normal map corresponding to an angle of the face included in the image exists among a plurality of reference normal maps stored in the memory 130.

If the reference normal map corresponding to the pose of the face included in the image exists, in operation 703, the electronic device can choose the corresponding reference normal map, as a normal map corresponding to the pose of the face. For example, the memory 130 can include a 1st reference normal map 800 for the front of the face as in FIG. 8A and a 2nd reference normal map 810 for the side (e.g., roughly 30°) of the face as in FIG. 8B. In examples where the angle of the face included in the image is roughly 30°, the processor 120 can choose the 2nd reference normal map 810 stored in the memory 130, as the normal map corresponding to the face of the image.

If the reference normal map corresponding to the pose of the face included in the image does not exist, in operation 705, the electronic device can generate a normal map corresponding to the pose of the face, based on a plurality of reference normal maps. For example, the processor 120 can generate a normal map 820 corresponding to an angle (e.g., roughly 22.5°) of the face included in the image as in FIG. 8C, through interpolation of using the 1st reference normal map 800 and the 2nd reference normal map 810.

In operation 707, the electronic device can generate an update variable of the normal map corresponding to the pose of the face, based on a feature point of the face included in the image. For example, the processor 120 can compare the positions of a feature point of a normal map 900 corresponding to a face included in an image as in FIG. 9A and a feature point of a face region 910 included in an image to apply a virtual lighting effect as in FIG. 9B. The processor 120 can generate the normal map update variable, based on a position difference of the feature point included in the face region. For instance, the processor 120 can generate the normal map update variable, based on a difference of distance between feature points included in the face region.

In operation 709, the electronic device can update the normal map corresponding to the face region of the image, based on the update variable of the normal map. For example, the processor 120 can update the normal map corresponding to the face region of the image, based on the normal map update variable generated in operation 707. For instance, the processor 120 can adjust (902→922) a distance of the feature point 920 of the normal map to correspond to the face region included in the image, as in FIG. 9C.

Figure 10:
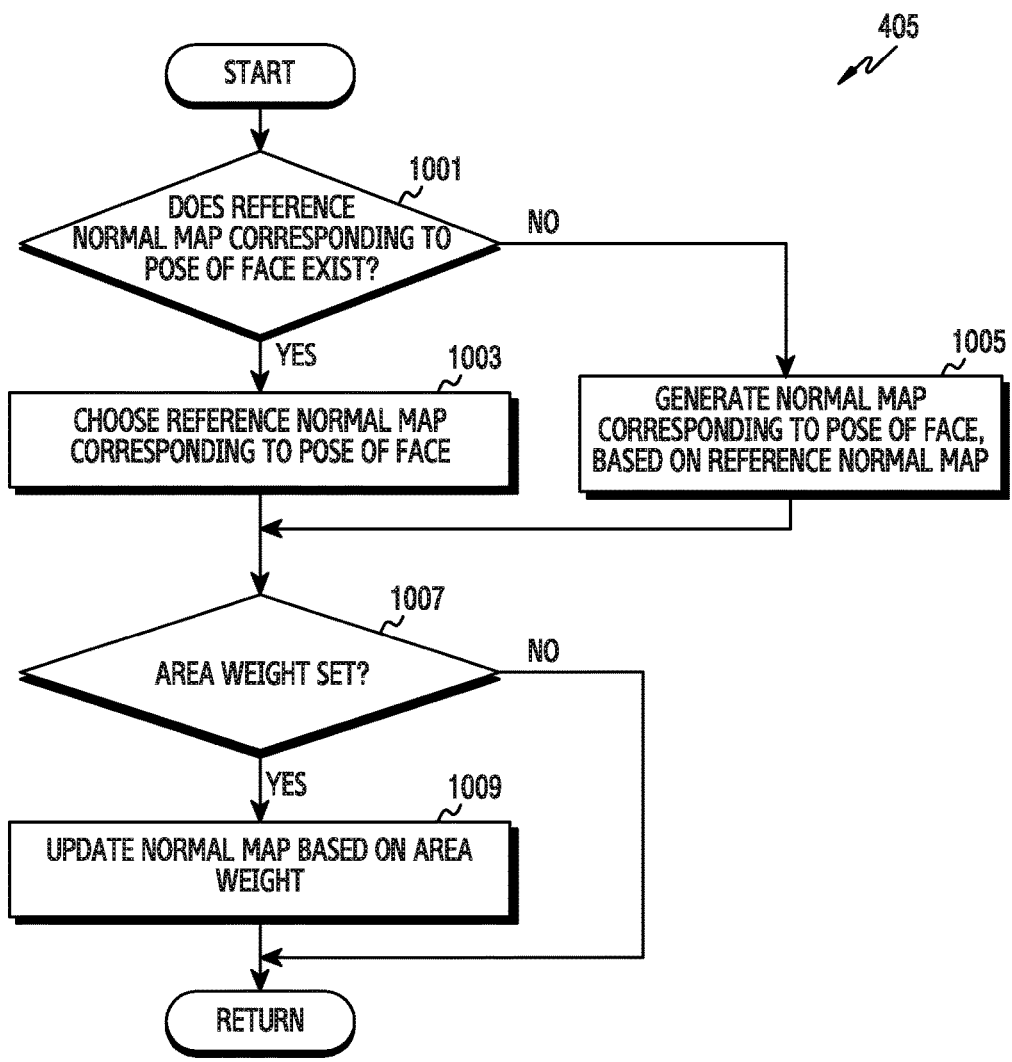
FIG. 10 illustrates a flowchart for updating a normal map by facial area in an electronic device according to various embodiments of the present disclosure.
Figure 11:
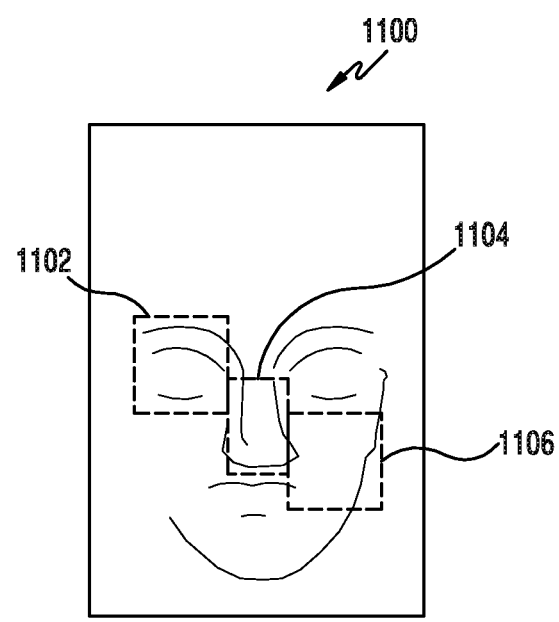
FIG. 11 illustrates a conceptual diagram for updating a normal map by facial area in an electronic device according to various embodiments of the present disclosure.

FIG. 10 illustrates a flowchart for updating a normal map by facial area in an electronic device according to various embodiments of the present disclosure. The following description is made for operation 405 of FIG. 4 for determining a normal map corresponding to a face region, using a conceptual diagram of FIG. 11. FIG. 11 illustrates the conceptual diagram for updating the normal map by facial area in the electronic device according to various embodiments of the present disclosure. In the following description, the electronic device can include the electronic device 101 of FIG. 1A and FIG. 1B or the processor 120 of the electronic device 101.

Referring to FIG. 10, if detecting a face region from an image to apply a virtual lighting effect (e.g., operation 403 of FIG. 4), in operation 1001, the electronic device can check if a previously stored reference normal map corresponding to the pose of a face included in the image exists. For example, the processor 120 can check if the reference normal map corresponding to an angle (e.g., an up/down/ left/right angle of the face) of the face included in the image has been stored in the memory 130 of the electronic device 101.

If the reference normal map corresponding to the pose of the face included in the image exists, in operation 1003, the electronic device can choose the reference normal map corresponding to the pose of the face, as a normal map corresponding to the face region included in the image. For example, the processor 120 can extract the reference normal map corresponding to the angle of the face included in the image, out of a plurality of normal maps stored in the memory 130.

If the reference normal map corresponding to the pose of the face included in the image does not exist, in operation 1005, the electronic device can generate a normal map corresponding to the face region of the image, using the plurality of previously stored reference normal maps. For example, the processor 120 can choose the plurality of reference normal maps capable of setting a range of including an angle of the face included in the image, based on a face angle of each reference normal map stored in the memory 130. The processor 120 can generate a normal map corresponding to the angle of the face included in the image, through interpolation of using the plurality of reference normal maps.

In operation 1007, the electronic device can check if a facial area weight has been set. For example, the processor 120 can check if an area weight application menu has been enabled. For example, the processor 120 can check if a weight to apply to a specific area (e.g., object) of the face has been set to the memory 130. For instance, the area weight can include a normal map adjustment value for additionally applying a visual effect (e.g., an embossing effect) on a specific area (e.g., a nose) of the face, at virtual lighting effect application.

If the facial area weight has been set, in operation 1009, the electronic device can update the normal map corresponding to the face region of the image, based on the area weight. For example, as in FIG. 11, if weights have been set on a left eye 1102, a nose 1104 and a right cheek 1106 in the face region, the processor 120 can update a normal map 1100 to correspond to the area weights. For instance, the processor 120 can adjust a normal vector of a pixel included in an area to which a weight is set, to correspond to the weight.

According to one embodiment, the electronic device can additionally update a normal map, which is updated based on a facial area weight, based on a feature point of a face. For example, as in operations 707 to 709 of FIG. 7, the processor 120 can compare the positions of a feature point of the normal map updated based on the area weight and a feature point of a face region included in an image to apply a virtual lighting effect. The processor 120 can additionally update the updated normal map, based on a position difference of the feature point included in the face region.

According to one embodiment, the electronic device can additionally update a normal map updated based on a feature point of a face included in an image, based on a facial area weight. For example, the processor 120 can additionally update the normal map updated through operations 701 to 709 of FIG. 7, to correspond to the facial area weight.

Figure 12:
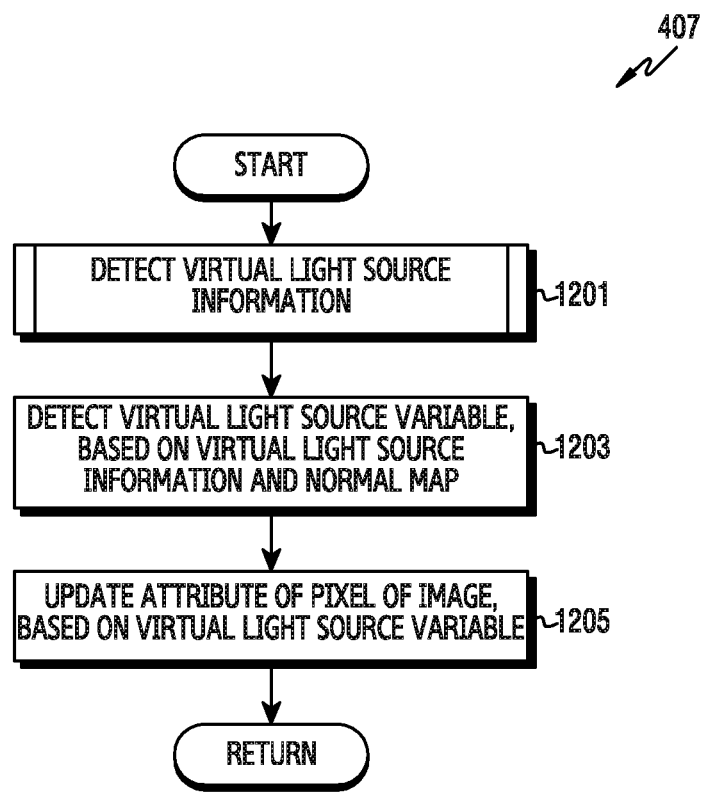
FIG. 12 illustrates a flowchart for applying a virtual lighting effect, based on virtual light source information and a normal map in an electronic device according to various embodiments of the present disclosure.

FIG. 12 illustrates a flowchart for applying a virtual lighting effect, based on virtual light source information and a normal map in an electronic device according to various embodiments of the present disclosure. The following description is made for operation 407 of FIG. 4 for applying the virtual lighting effect to an image. In the following description, the electronic device can include the electronic device 101 of FIG. 1A and FIG. 1B or the processor 120 of the electronic device 101.

Referring to FIG. 12, if determining a normal map corresponding to a face region of an image (e.g., operation 405 of FIG. 4), in operation 1201, the electronic device can detect virtual light source information for applying a virtual lighting effect to the face region of the image. For example, the processor 120 can display a virtual light source list stored in the memory 130 through the display 160. The processor 120 can choose the virtual light source information for applying the virtual lighting effect to the face region of the image, based on a user input to the virtual light source list displayed on the display 160. For example, the processor 120 can detect light source information (or virtual light source information) included in a preference picture that is set by a user. For example, the processor 120 can analyze the preference picture set by the user and extract the light source information included in the preference picture. For instance, the virtual light source information can include at least one of a position of a virtual light source, a quantity of light thereof, and a color thereof.

In operation 1203, the electronic device can detect a virtual light source variable for the virtual lighting effect of the image, based on the normal map corresponding to the face region of the image and the virtual light source information. For example, the processor 120 can calculate the virtual light source variable for changing an attribute of each pixel included in the face region of the image, based on a normal vector included in the normal map corresponding to the face region of the image and the position and quantity of light of the virtual light source. For example, the processor 120 can update the normal vector included in the normal map corresponding to the face region of the image, based on a virtual lighting effect table corresponding to the position and quantity of light of the virtual light source, and generate the virtual light source variable. For instance, the attribute of the pixel can include a brightness of the pixel, a color thereof, or a combination of the brightness and the color.

In operation 1205, the electronic device can update the attribute of the pixel included in the face region of the image, based on the virtual light source variable. For example, the processor 120 can adjust a brightness value of each pixel included in the face region of the image to correspond to the virtual light source variable, and apply the virtual lighting effect to the face region of the image. Additionally or alternatively, the processor 120 can adjust a color of each pixel included in the face region of the image to correspond to the virtual light source variable.

Figure 13:
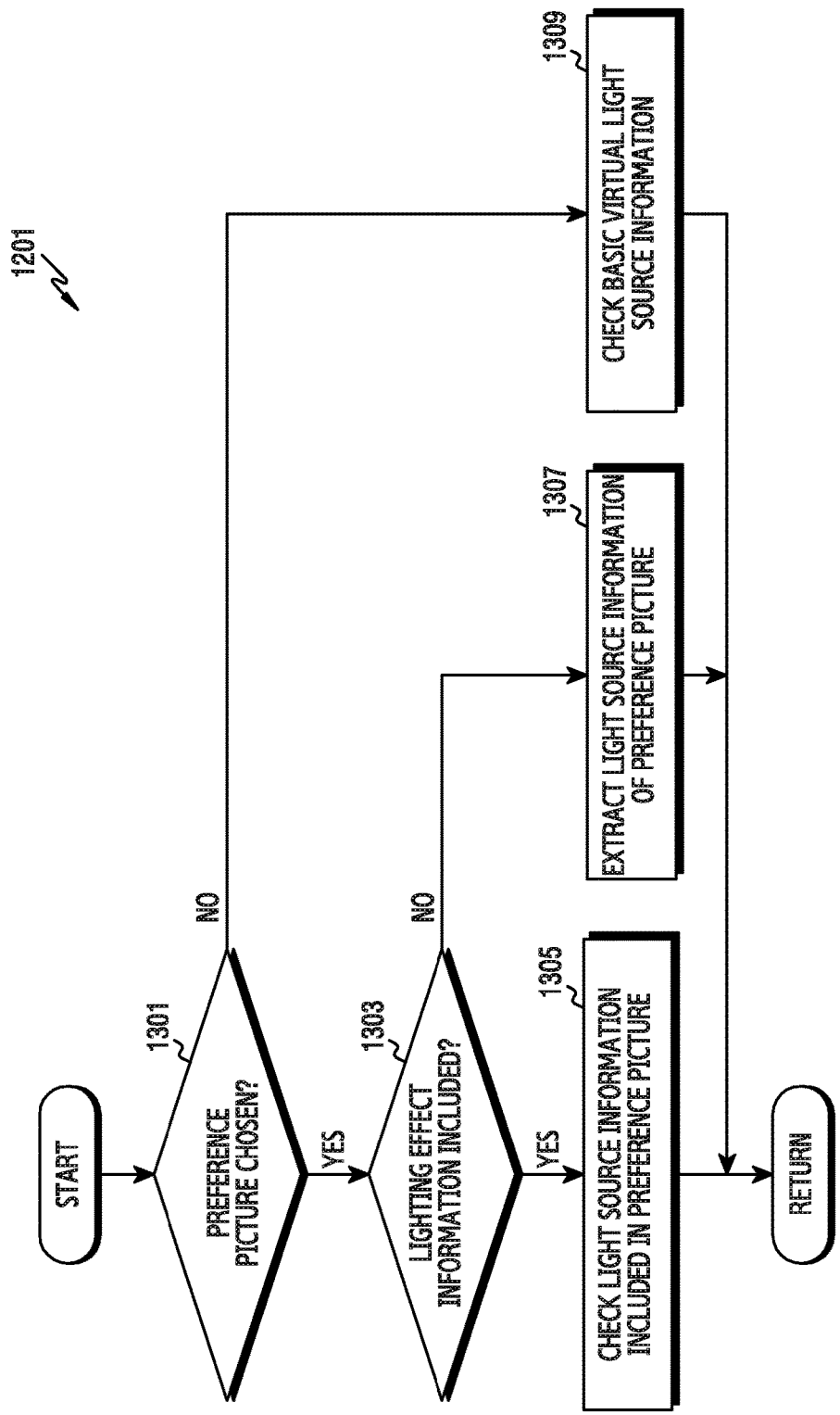
FIG. 13 illustrates a flowchart for detecting virtual light source information in an electronic device according to various embodiments of the present disclosure.

FIG. 13 illustrates a flowchart for detecting virtual light source information in an electronic device according to various embodiments of the present disclosure. The following description is made for operation 1201 of FIG. 12 for detecting the virtual light source information. In the following description, the electronic device can include the electronic device 101 of FIG. 1A and FIG. 1B or the processor 120 of the electronic device 101.

Referring to FIG. 13, in operation 1301, the electronic device can check if a preference picture (or image) that will be used for applying a virtual lighting effect to an image (e.g., an image acquired in operation 401 of FIG. 4) is chosen. For example, the processor 120 can check if a preference picture application menu has been enabled. For example, the processor 120 can check if the preference picture for the virtual lighting effect has been set to the memory 130.

If the preference picture that will be used for applying the virtual lighting effect is chosen, in operation 1303, the electronic device can check if the preference picture includes light source information. For example, the processor 120 can check if the light source information of the preference picture is additionally included in an image file including the preference picture. For instance, the light source information can include a position of a light source and a quantity of light thereof. The light source information can additionally include a color of the light source.

If the preference picture includes the light source information, in operation 1305, the electronic device can check the light source information included in the preference picture. For example, the processor 120 can check light source information of a time point at which a camera module photographs a corresponding preference picture, included in image data including the preference picture. For example, the processor 120 can check the light source information on the virtual lighting effect applied to the corresponding preference picture, included in the image data including the preference picture.

If the preference picture does not include the light source information, in operation 1307, the electronic device can analyze the preference picture and extract the light source information on the preference picture. For example, the processor 120 can analyze a histogram for a pixel attribute (e.g., a brightness, a color, a color temperature, etc.) of at least a part of the preference picture, and extract the light source information on the preference picture.

If the preference picture that will be used for applying the virtual lighting effect is not chosen, in operation 1309, the electronic device can check basic virtual light source information. For example, if the preference picture that will be used for applying the virtual lighting effect is not chosen, the processor 120 can control the display 160 to display a virtual light source list stored in the memory 130. The processor 120 can choose virtual light source information applied to an image out of the virtual light source list displayed on the display 160, based on input information detected through the input output interface 150.

Figure 14:
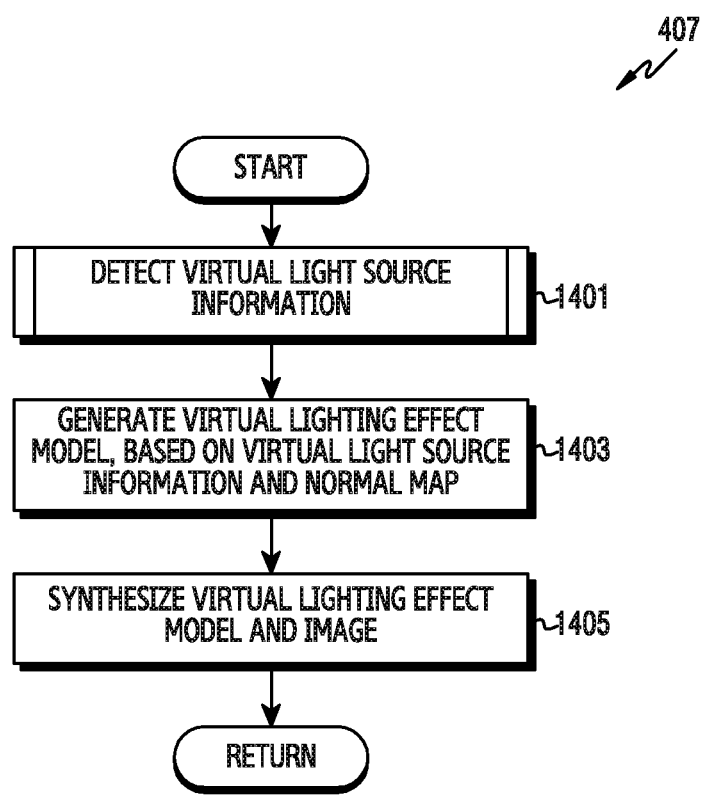
FIG. 14 illustrates a flowchart for applying a virtual lighting effect, based on a virtual lighting effect model corresponding to virtual light source information in an electronic device according to various embodiments of the present disclosure.
Figure 15A:
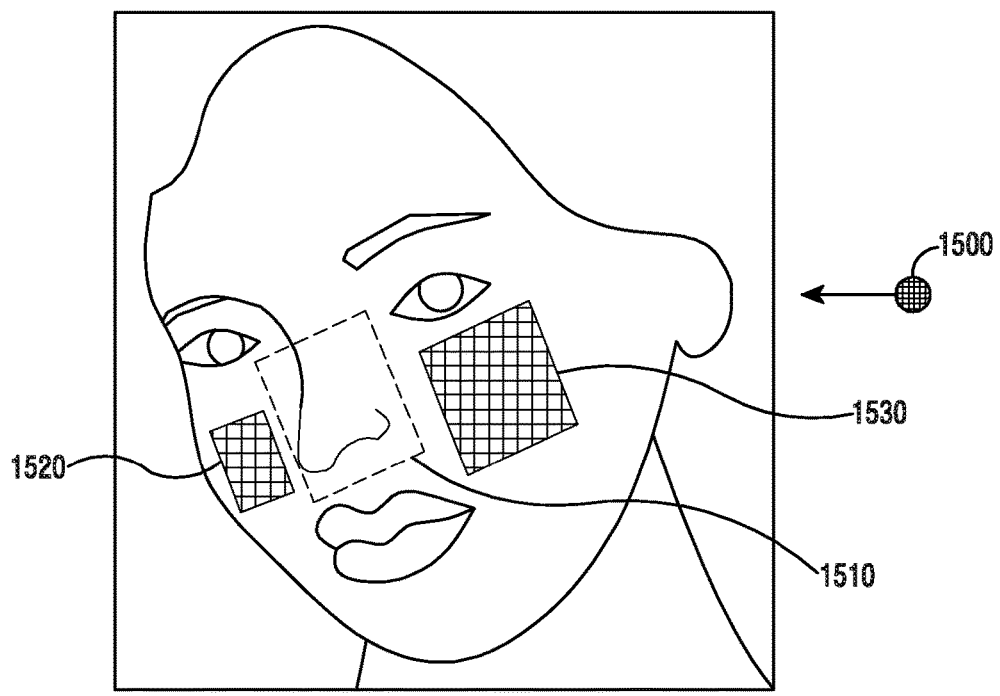
FIG. 15A to FIG. 15B illustrate conceptual diagrams for applying a virtual lighting effect in an electronic device according to various embodiments of the present disclosure.
Figure 15B:
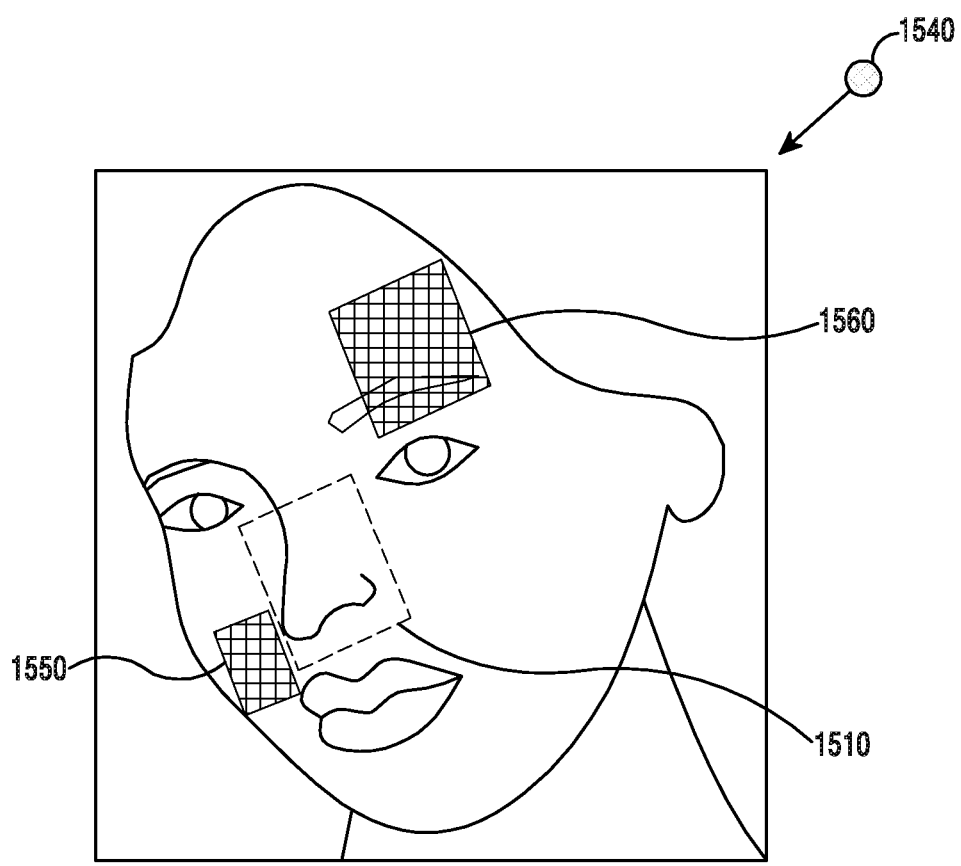

FIG. 14 illustrates a flowchart for applying a virtual lighting effect, based on a virtual lighting effect model corresponding to virtual light source information in an electronic device according to various embodiments of the present disclosure. The following description is made for operation 407 of FIG. 4 for applying the virtual lighting effect to an image, using conceptual diagrams of FIG. 15A to FIG. 15B. FIG. 15A to FIG. 15B illustrate the conceptual diagrams for applying the virtual lighting effect in the electronic device according to various embodiments of the present disclosure. In the following description, the electronic device can include the electronic device 101 of FIG. 1A and FIG. 1B or the processor 120 of the electronic device 101.

Referring to FIG. 14, if determining a normal map corresponding to a face region of an image (e.g., operation 405 of FIG. 4), in operation 1401, the electronic device can detect virtual light source information for a virtual lighting effect of the image. For example, the processor 120 can detect the virtual light source information for applying the virtual lighting effect to the face region of the image, as in operation 1301 to operation 1309 of FIG. 13.

In operation 1403, the electronic device can detect a virtual lighting effect model, based on the normal map corresponding to the face region of the image and the virtual light source information. For example, the processor 120 can generate a model (i.e., image) corresponding to the face region for applying the virtual lighting effect, based on the normal map corresponding to the face region of the image. The processor 120 can apply the virtual lighting effect to the model corresponding to the face region, based on a position of a virtual light source and a quantity of light thereof. For instance, the processor 120 can apply a normal vector of the model corresponding to the face region, based on the position and quantity of light of the virtual light source.

In operation 1405, the electronic device can synthesize the image to apply the virtual lighting effect and the virtual lighting effect model, and apply the virtual lighting effect. For example, as in FIG. 15A, in examples where a virtual light source 1500 is situated at the right of an image, the processor 120 can adjust a brightness of a face region of the image to correspond to a distance with the virtual light source 1500 in order to show an effect in which the virtual light source 1500 is projected on the face region of the image. For instance, the processor 120 can decrease a brightness of a 1st region 1520, which is arranged relatively far away from the virtual light source 1500 with a criterion of a nose area 1510 in the face region, less than the original image, and increase a brightness of a 2nd region 1530, which is arranged close to the virtual light source 1500, greater than the original image. For example, as in FIG. 15B, in examples where a virtual light source 1540 is situated at the right and top of an image, the processor 120 can adjust a brightness of a face region of the image to correspond to a distance with the virtual light source 1500 in order to show an effect in which the virtual light source 1540 is projected on the face region of the image. For instance, the processor 120 can decrease a brightness of a 3rd region 1550, which is arranged relatively far away from the virtual light source 1540 with a criterion of a nose area 1510 in the face region, less than the original image, and increase a brightness of a 4th region 1560 arranged close to the virtual light source 1540, greater than the original image.

Figure 16:
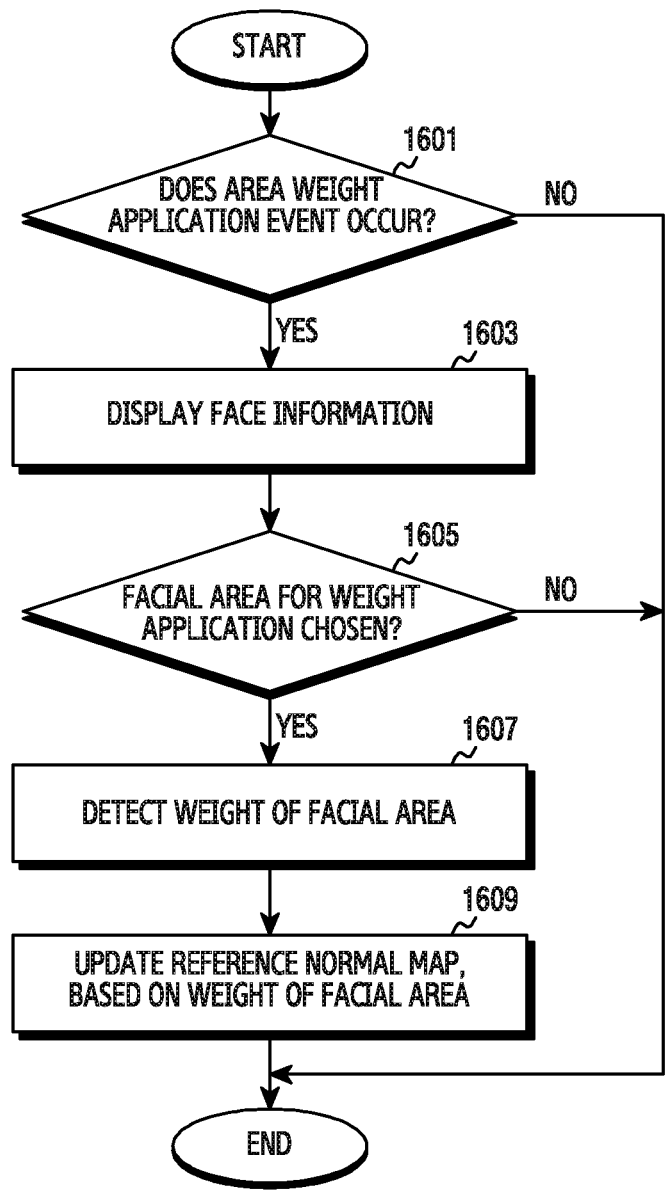
FIG. 16 illustrates a flowchart for updating a reference normal map in an electronic device according to various embodiments of the present disclosure.

FIG. 16 illustrates a flowchart for updating a reference normal map in an electronic device according to various embodiments of the present disclosure. In the following description, the electronic device can include the electronic device 101 of FIG. 1A and FIG. 1B or the processor 120 of the electronic device 101.

Referring to FIG. 16, in operation 1601, the electronic device can check if a facial area weight application event takes place. For example, the processor 120 can check if a selection input for an icon corresponding to the weight application event through the input output interface 150 or a touch screen is detected. For instance, if detecting the selection input for the icon corresponding to the weight application event, the processor 120 can determine that the facial area weight application event takes place.

If the occurrence of the facial area weight application event is sensed, in operation 1603, the electronic device can display face information so that a user may choose a facial area to apply a weight. For example, as in FIG. 11, the processor 120 can display a face image of a front direction through the display 160. In this example, the processor 120 can display areas (e.g., a left eye 1102, a nose 1104, a right cheek 1106, etc.) capable of applying weights in the face image.

In operation 1605, the electronic device can check if a facial area to apply a weight is chosen. For example, as in FIG. 11, the processor 120 can check if an input (e.g., a touch input) to at least one area capable of applying a weight in the face information displayed on the display 160 is sensed.

If the at least one area to apply the weight is chosen in the face information displayed on the display, in operation 1607, the electronic device can detect a weight that will be applied to the corresponding area. For example, if the at least one area to apply the weight is chosen, the processor 120 can control the display 160 to display a weight setting screen. The processor 120 can check a weight on at least one area inputted through the weight setting screen displayed on the display 160.

In operation 1609, the electronic device can update a reference normal map that will be used for applying a virtual lighting effect, based on the facial area weight. For example, if a weight of a nose area is set in a face region, the processor 120 can adjust a normal vector of the nose area for reference normal maps stored in the memory 130, to correspond to the corresponding weight of the nose area.

According to various embodiments of the present disclosure, a method for operating in an electronic device can include the operations of acquiring an image, detecting a face region from the image, determining a normal map corresponding to at least a partial region of the face region on at least the basis of a 1st normal map and a 2nd normal map stored in the electronic device, and displaying the image in a state in which a virtual lighting effect is applied to the at least partial region or a peripheral region thereof, on at least the basis of the determined normal map.

According to various embodiments, the operation of determining the normal map can include the operations of detecting the pose of a face included in the image, and generating a normal map corresponding to the pose of the face on the basis of the 1st normal map and the 2nd normal map.

According to various embodiments, the operation of generating the normal map can include the operation of generating the normal map corresponding to the pose of the face through interpolation of using the 1st normal map and the 2nd normal map.

According to various embodiments, the operation of determining the normal map can include the operations of detecting the pose of the face included in the image, and choosing any one normal map corresponding to the pose of the face among the 1st normal map and the 2nd normal map.

According to various embodiments, the operation of determining the normal map can include the operations of determining the normal map corresponding to the at least partial region of the face region detected from the image on the basis of the 1st normal map and the 2nd normal map, and updating the determined normal map, based on a facial area weight.

According to various embodiments, the operation of determining the normal map can include the operations of determining the normal map corresponding to the at least partial region of the face region detected from the image on the basis of the 1st normal map and the 2nd normal map, and updating the determined normal map, based on a position difference of a feature point of the determined normal map and a feature point of the face region detected from the image.

According to various embodiments, if a facial area weight is set, the 1st normal map and the 2nd normal map can be updated based on the facial area weight.

According to various embodiments, the operation of displaying the image can include the operations of detecting virtual light source information, applying a virtual lighting effect to at least a part of the face region included in the image, based on the virtual light source information and the determined normal map, and displaying the image to which the virtual lighting effect is applied.

According to various embodiments, the operation of detecting the virtual light source information can include the operations of detecting light source information of a preference picture, and setting the light source information of the preference picture as the virtual light source information.

According to various embodiments, the virtual light source information can include at least one of a position of a virtual light source, a quantity of light, a color, and a type.

An electronic device and an operation method thereof according to various embodiments can reduce the number of operations for applying a virtual lighting effect, by applying the virtual lighting effect to an image based on a normal map corresponding to a face included in the image.

An electronic device and an operation method thereof according to various embodiments can apply a virtual lighting effect matching to an image, by applying the virtual lighting effect to the image based on a normal map that is updated to correspond to a size of a face included in the image.

An electronic device and an operation method thereof according to various embodiments can adaptively apply a virtual lighting effect that a user desires by facial area, by differently setting a weight of a normal map by area of a face included in an image.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

According to various embodiments of the present disclosure, there can be provided a computer-readable recording medium recording a program for executing the operations of acquiring an image, detecting a face region from the image, determining a normal map corresponding to at least a partial region of the face region on at least the basis of a 1st normal map and a 2nd normal map stored in the electronic device, and displaying the image in a state in which a virtual lighting effect is applied to the at least partial region or a peripheral region thereof, on at least the basis of the determined normal map.

According to various embodiments, there can be provided the computer-readable recording medium wherein the operation of determining the normal map includes the operations of detecting the pose of a face included in the image, and generating a normal map corresponding to the pose of the face through interpolation of using the 1st normal map and the 2nd normal map.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a display;
   a memory configured to store a first normal map and a second normal map corresponding to a face; and
   a processor configured to:
      acquire a first image,
      detect a face region in the first image,
      determine a normal map corresponding to at least a portion of the face region based on the first normal map and the second normal map,
      update the normal map based on a position difference between a feature point in the normal map and a feature point in the first image, and
      control the display to display, a second image based on the updated normal map on the display, wherein the second image is generated by applying a virtual lighting effect based on the updated normal map to the at least the portion of the face region in the first image.

2. The electronic device of claim 1, wherein the processor is configured to:
   detect a pose of the face in the first image; and
   generate a normal map corresponding to the pose of the face based on the first normal map and the second normal map.

3. The electronic device of claim 2, wherein the processor is configured to generate the normal map corresponding to the pose of the face through interpolation using the first normal map and the second normal map.

4. The electronic device of claim 1, wherein the processor is configured to:
   detect a pose of the face captured in the first image, and
   choose any one normal map corresponding to the pose of the face among the first normal map and the second normal map.

5. The electronic device of claim 1, wherein the processor is configured to update the normal map, based on a facial area weight.

6. The electronic device of claim 1, wherein the processor is configured to:
   determine whether a facial area weight has been chosen, and
   in response to determine that the facial area weight has been chosen, update the first normal map and the second normal map based on the facial area weight.

7. The electronic device of claim 1, wherein the processor is configured to:
   detect virtual light source information;
   apply a first virtual lighting effect to at least a part of the face region in the first image or the second image, based on the virtual light source information and the normal map; and
   display a third image on the display, wherein the third image comprises one of the first or second image, after the first virtual lighting effect is applied.

8. The electronic device of claim 7, wherein the processor is configured to:
   detect light source information of a preference picture; and
   set the light source information of the preference picture as the virtual light source information.

9. The electronic device of claim 7, wherein the virtual light source information comprises at least one of a position of a virtual light source, a quantity of light, a color, and a type.

10. A method for operating an electronic device, the method comprising:
    acquiring, a first image comprising a face;
    detecting a face region in the first image;
    determining a normal map corresponding to at least a portion of the face region based on a first normal map and a second normal map stored in the electronic device;
    updating the normal map based on a position difference between a feature point in the normal map and a feature point in the first image; and
    displaying, a second image based on the updated normal map, wherein the second image is generated by applying a virtual lighting effect based on the updated normal map to the at least the portion of the face region in the first image.

11. The method of claim 10, wherein determining the normal map comprises:
    detecting a pose of the face in the first image; and
    generating a normal map corresponding to the pose of the face based on the first normal map and the second normal map.

12. The method of claim 11, wherein generating the normal map comprises interpolation using the first normal map and the second normal map.

13. The method of claim 10, wherein determining the normal map comprises updating the normal map, based on a facial area weight.

14. The method of claim 10, further comprising:
    determine whether a facial area weight has been chosen; and
    in response to determine that the facial area weight has been chosen, updating the first normal map and the second normal map based on the facial area weight.

15. The method of claim 10, wherein displaying the second image comprises:

detecting virtual light source information;

applying a first virtual lighting effect to at least a part of the face region in the first image or the second image, based on the virtual light source information and the normal map; and displaying a third image, wherein the third image comprises one of the first or second image, after the first virtual lighting effect is applied.

16. The method of claim 15, wherein detecting the virtual light source information comprises:

detecting light source information of a preference picture; and setting the light source information of the preference picture as the virtual light source information.

17. A non-transitory computer-readable recording medium comprising program code that, when executed by a processor, causes an electronic device to:

acquire a first image comprising a face;

detect a face region in the first image;

determine a normal map corresponding to at least a portion of the face region based on a first normal map and a second normal map stored in the electronic device;

update the normal map based on a position difference between a feature point in the normal map and a feature point in the first image; and display, a second image based on the updated normal map, wherein the second image is generated by applying a virtual lighting effect based on the updated normal map to the at least the portion of the face region in the first image.

18. The non-transitory computer-readable recording medium of claim 17, wherein determining the normal map comprises:

detecting a pose of the face in the first image; and generating a normal map corresponding to the pose of the face through interpolation using the first normal map and the second normal map.

* * * * *